(12) United States Patent
Watanabe et al.

(10) Patent No.: US 10,081,506 B2
(45) Date of Patent: Sep. 25, 2018

(54) FEEDING DEVICE, IMAGE FORMING SYSTEM, AND CONVEYED MEDIUM INSPECTION SYSTEM

(71) Applicants: Takeshi Watanabe, Kanagawa (JP); Kyosuke Nakada, Kanagawa (JP); Kiyoshi Hata, Tokyo (JP); Mamoru Yorimoto, Kanagawa (JP); Yuichiro Maeyama, Kanagawa (JP); Isao Matsushima, Kanagawa (JP); Kahei Nakamura, Tokyo (JP)

(72) Inventors: Takeshi Watanabe, Kanagawa (JP); Kyosuke Nakada, Kanagawa (JP); Kiyoshi Hata, Tokyo (JP); Mamoru Yorimoto, Kanagawa (JP); Yuichiro Maeyama, Kanagawa (JP); Isao Matsushima, Kanagawa (JP); Kahei Nakamura, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/412,533

(22) Filed: Jan. 23, 2017

(65) Prior Publication Data
US 2017/0210579 A1    Jul. 27, 2017

(30) Foreign Application Priority Data
Jan. 25, 2016    (JP) .................. 2016-011630

(51) Int. Cl.
*B65H 3/08*     (2006.01)
*G03G 15/00*    (2006.01)
*H04N 1/00*     (2006.01)

(52) U.S. Cl.
CPC .......... *B65H 3/08* (2013.01); *G03G 15/6529* (2013.01); *H04N 1/0066* (2013.01); (Continued)

(58) Field of Classification Search
CPC .......... B65H 3/12; B65H 3/08; B65H 3/0816; B65H 3/0833; B65H 5/22; B65H 5/222; (Continued)

(56) References Cited

U.S. PATENT DOCUMENTS 7,007,942 B1* 3/2006 Stearns .................. B65H 3/08
271/108
2011/0272877 A1* 11/2011 Wardak .................. B65H 3/128
271/12

(Continued)

FOREIGN PATENT DOCUMENTS

JP    2014-152023    8/2014

*Primary Examiner* — Thomas A Morrison
(74) *Attorney, Agent, or Firm* — Harness, Dickey & Pierce, P.L.C.

(57) ABSTRACT

A feeding device to feed a conveyed medium stacked on a stacker, includes a first suction unit, a second suction unit, and third suction units. The first suction unit includes a suction chamber; a suction fan to exhaust air from the suction chamber; and a first driver to rotate the suction fan. The suction units are disposed above the conveyed medium stacked on the stacker. The second suction unit includes a rotary fan including a board and a plurality of walls extending from the board; and a second driver to rotate the rotary fan. The second suction unit generates a vortex flow directed to the conveyed medium. The plurality of third suction units is disposed in a direction perpendicular to a conveyance direction of the conveyed medium and attracts ends of the conveyed medium in the direction perpendicular to the conveyance direction.

17 Claims, 26 Drawing Sheets

(52) U.S. Cl.
CPC ..... *H04N 1/00625* (2013.01); *H04N 1/00628* (2013.01); *H04N 2201/0082* (2013.01)

(58) Field of Classification Search
CPC ........................... B65H 5/228; B65H 2406/30; B65H 2406/31; B65H 2406/323; B65H 2406/36; B65H 2406/363; B65H 2406/3662; G03G 15/6529; H04N 1/00625; H04N 1/00628; H04N 1/0066
See application file for complete search history.

(56) References Cited

U.S. PATENT DOCUMENTS

2014/0318929 A1* 10/2014 Kearney .............. B65H 29/241
198/689.1
2015/0225193 A1* 8/2015 Haeussler .............. B26D 7/018
294/183

* cited by examiner

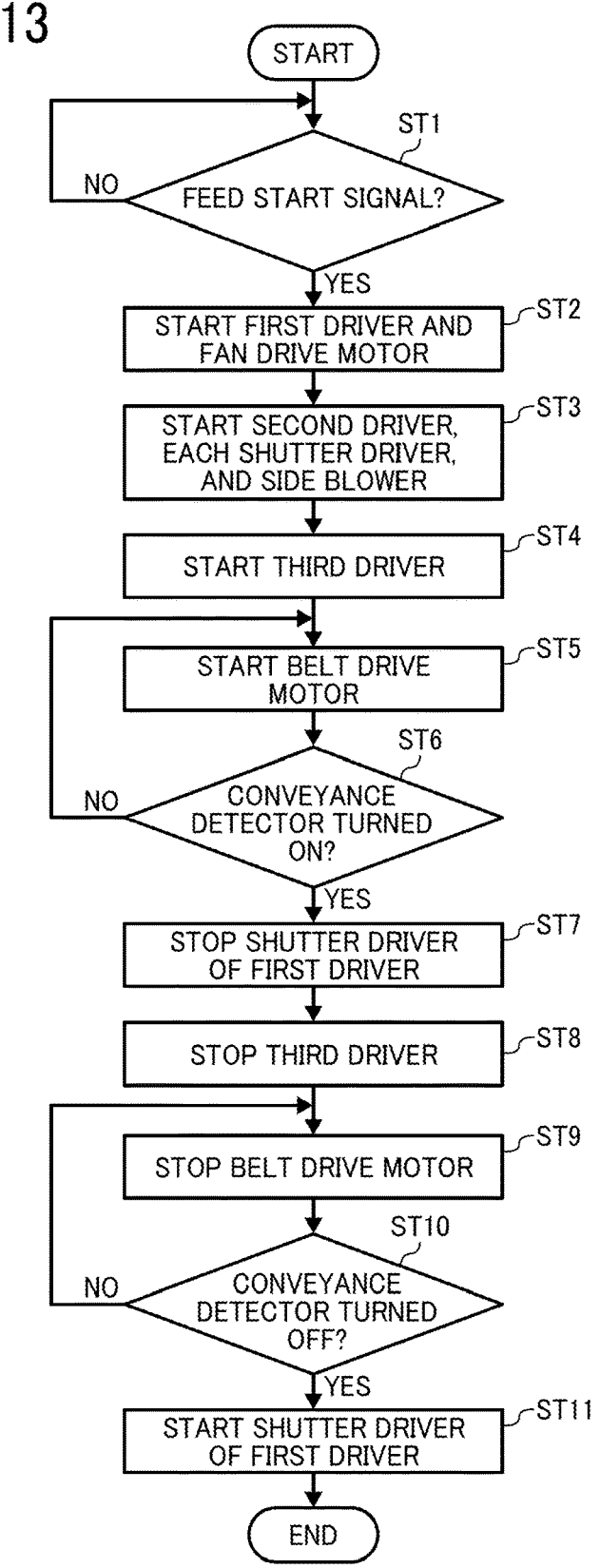

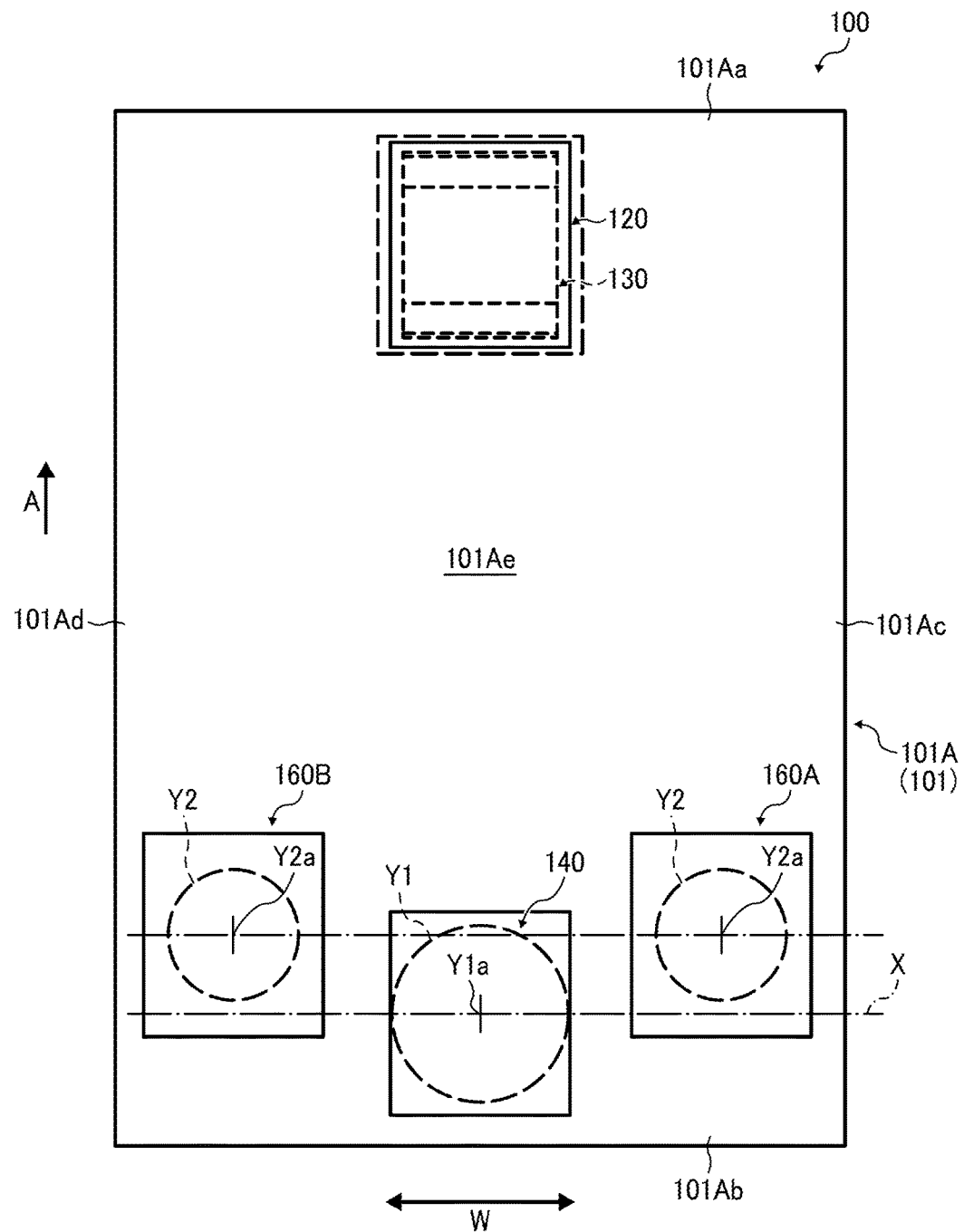

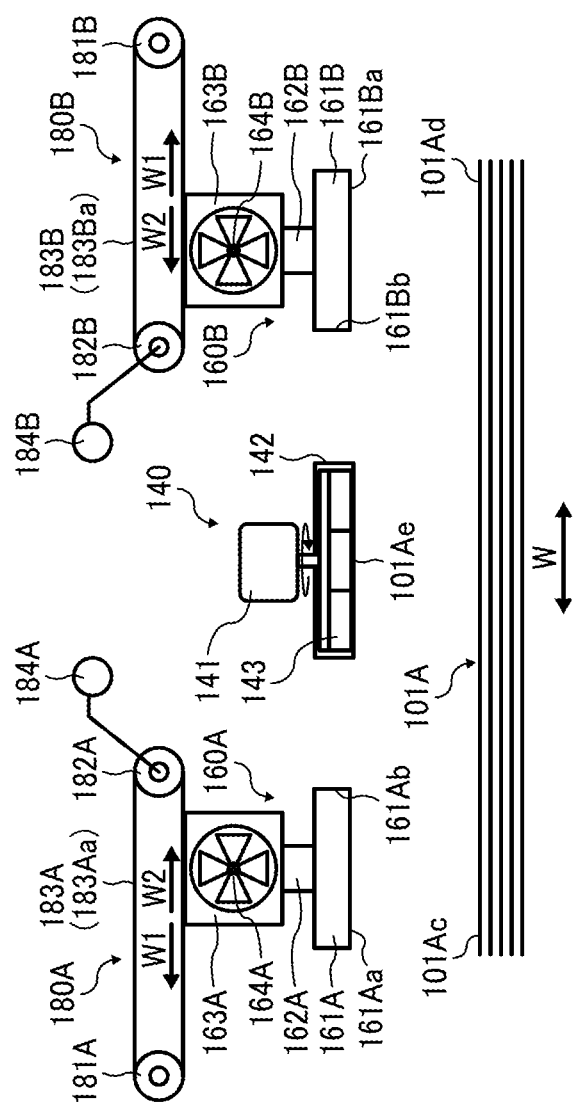

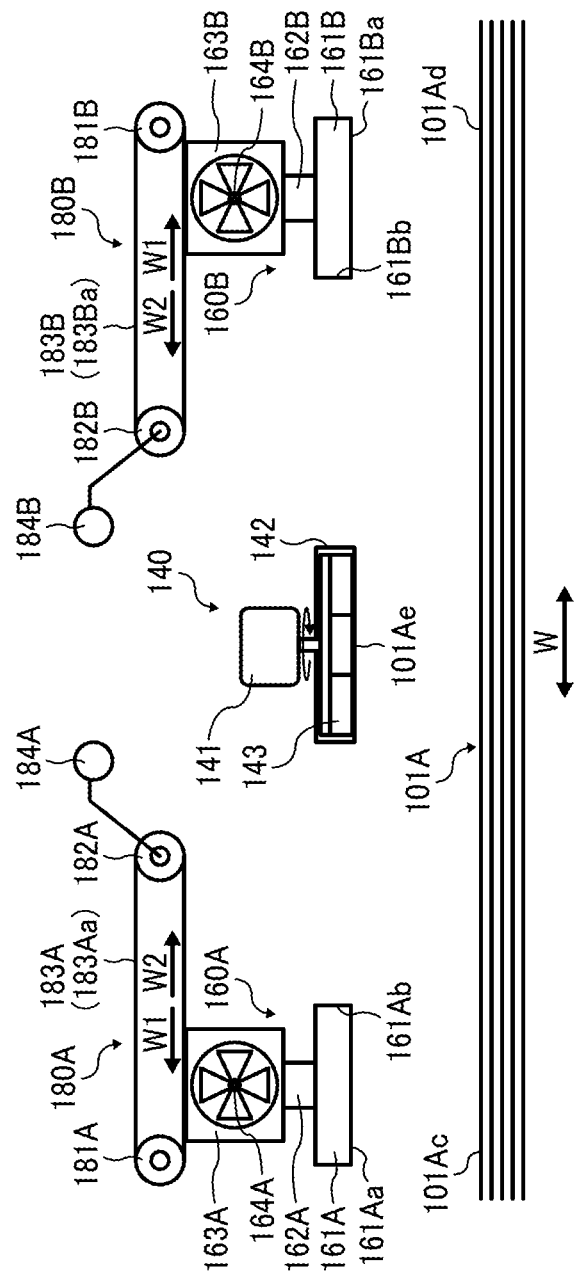

FEEDING DEVICE, IMAGE FORMING SYSTEM, AND CONVEYED MEDIUM INSPECTION SYSTEM

CROSS-REFERENCE TO RELATED APPLICATION

The present application claims priority pursuant to 35 U.S.C. § 119(a) from Japanese patent application number 2016-011630, filed on Jan. 25, 2016, the entire disclosure of which is incorporated by reference herein.

BACKGROUND

Technical Field

Exemplary embodiments of the present disclosure relate to a feeding device, an image forming system, and a conveyed medium inspection system.

Background Art

A feeding device to feed a conveyed medium to an image forming system such as a copier or a printer and to an inspection device may include a suction device to feed a topmost medium, and a conveyance device to convey the medium in a conveyance direction. The suction device sends air from a leading end of the conveyed medium to a trailing end thereof, and a plurality of air attracting devices disposed at the leading end and the trailing end of the conveyed medium attracts the air and conveys the medium.

SUMMARY

In one embodiment of the disclosure, provided is an improved feeding device to feed a conveyed medium stacked on a stacker, includes a first suction unit, a second suction unit, and a plurality of third suction units. The first suction unit is disposed above the conveyed medium stacked on the stacker, the first suction unit and includes a suction chamber; a suction fan to exhaust air from the suction chamber; and a first driver to rotate the suction fan. The second suction unit is disposed above the conveyed medium stacked on the stacker, and generates a vortex flow directed to the conveyed medium. The second suction unit includes a rotary fan including a board and a plurality of walls extending from the board; and a second driver to rotate the rotary fan. The plurality of third suction units is disposed in a direction perpendicular to a conveyance direction of the conveyed medium and above the conveyed medium stacked on the stacker, and attracts ends of the conveyed medium in the direction perpendicular to the conveyance direction.

In other embodiments of the present disclosure, provided are an image forming system including an image forming section and the above-described feeding device to feed the conveyed medium to the image forming section; and a conveyed medium inspection system including an inspection device to inspect a conveyed medium, and the above described feeding device to feed the conveyed medium to the inspection device.

These and other features and advantages of the present disclosure will become apparent upon consideration of the following description of embodiments of the present disclosure when taken in conjunction with the accompanying drawings.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 13 is a flow chart illustrating control of the feeding device according to the first embodiment;

FIG. 16A illustrates a suction state while the second suction unit is operating; and FIG. 16B illustrates a suction state while a third suction unit is operating;

FIG. 17 is a plan view illustrating a modified example of positioning the third suction unit;

FIGS. 20A and 20B each are views illustrating a structure and operation of a lateral shunt of a third suction unit; FIG. 20A is a view illustrating a position of the third suction unit when the third suction unit attracts a minimum-width conveyed medium; and FIG. 20B is a view illustrating a position of the third suction unit when the third suction unit attracts a maximum-width conveyed medium;

DETAILED DESCRIPTION

Figure 1:
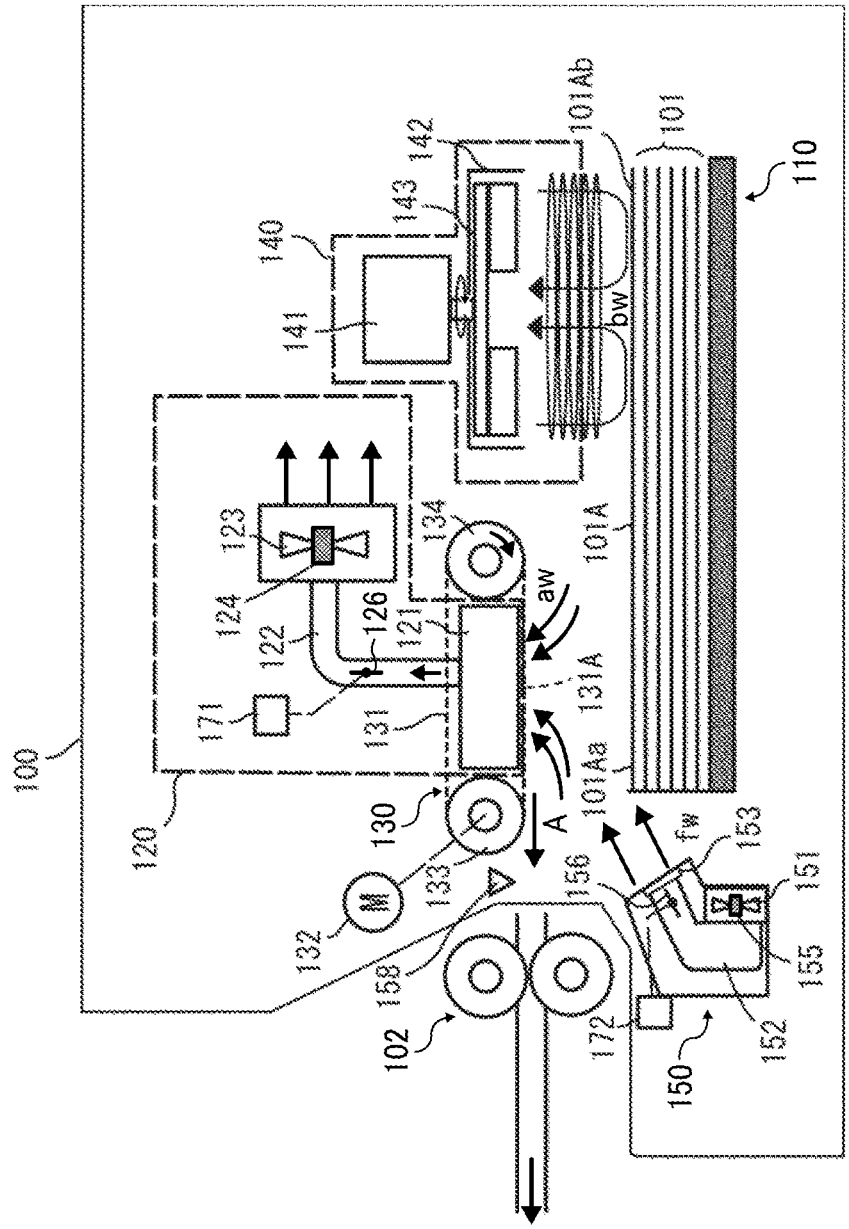
FIG. 1 schematically illustrates a feeding device according to the first embodiment of the present disclosure.

Hereinafter, embodiments of the present disclosure will be described with reference to accompanying drawings. In each embodiment, the same reference numeral is applied to the same or equivalent part, and redundant explanation is omitted as appropriate. In illustrated examples, each drawing may be partly omitted to help better understand the structure.

In the conventional device, when suction units employing various air aspiration methods attract and convey a conveyed medium, conveyance of the medium starts after separation air blown from the separator blows to a trailing end of the conveyed medium. This is because, when the conveyed medium starts to be conveyed before completion of separation of the conveyed medium, a following medium tends to be conveyed following the not-fully-separated medium due to friction between the conveyed media. However, waiting until the separation air blows through the trailing end of the conveyed medium results in delay of feeding the medium and prevents improvement of efficiency. In addition, separability and conveyability vary depending on a width of the conveyed medium and need to be handled accordingly.

By contrast, the feeding device of the present disclosure includes a plurality of attracting devices, such as a first suction unit, a second suction unit to generate a vortex flow, and third suction units to attract ends of the conveyed medium disposed in the direction perpendicular to the conveyance direction, so that the suction force to the conveyed medium is improved and a new feeding device with superior separability of the conveyed medium can be provided.

First Embodiment

A structure of a feeding device 100 according to the present embodiment will be described. As illustrated in FIG. 1, the feeding device 100 includes, in an interior thereof, a stacker 110 on which a sheet-shaped conveyed medium 101 is stacked, a first suction unit 120, a conveyance device 130, a second suction unit 140, a fan 150 as a separator, third suction units 160A and 160B (see FIG. 9), and a controller 200 (see FIG. 11). In the following description, the word "media" is employed where appropriate.

Figure 2:
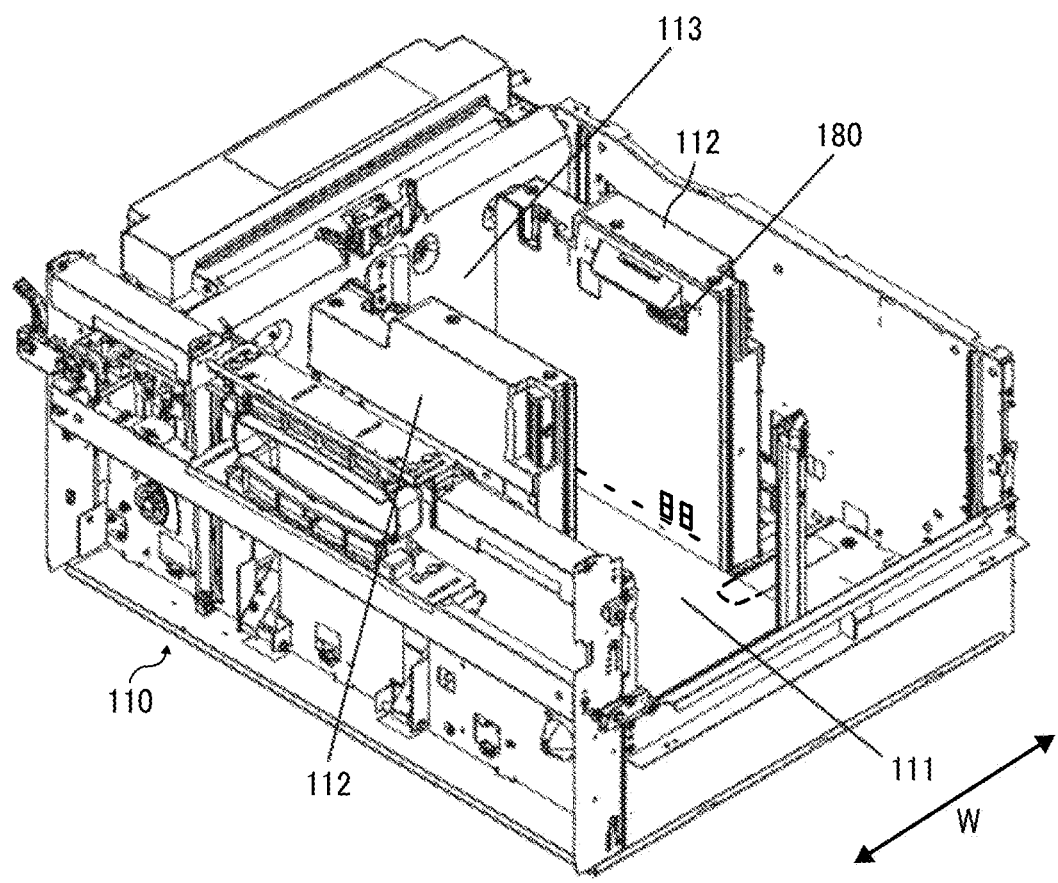
FIG. 2 is a perspective view illustrating a stacker of the feeding device.

The first suction unit 120 attracts a topmost conveyed medium 101 by generating a negative pressure to a suction chamber 121. The conveyance device 130 conveys the conveyed medium 101 in a conveyance direction A as indicated by arrow A, to another system positioned in the conveyance direction A. The second suction unit 140 attracts the conveyed medium 101 with a vortex flow. That is, the feeding device 100 according to the present embodiment includes two different types of suction units. The stacker 110 serves to stack a plurality of conveyed media 101 thereon. As illustrated in FIG. 2, the stacker 110 includes a lifting tray 111 including a lifting device that moves up and down in accordance with a remaining number of stacked media, so that the topmost conveyed medium 101A is kept at a constant height. The stacker 110 includes a pair of side fences 112 and 112, and a contact member 113. A distance between the pair of side fences 112 and 112 is variable corresponding to the width W of the conveyed medium 101. The contact member 113 is used to contact an end of the conveyed medium 101 and align a leading end of the conveyed medium 101. The arrow W is directed to a direction crossing the conveyance direction A.

Figure 3:
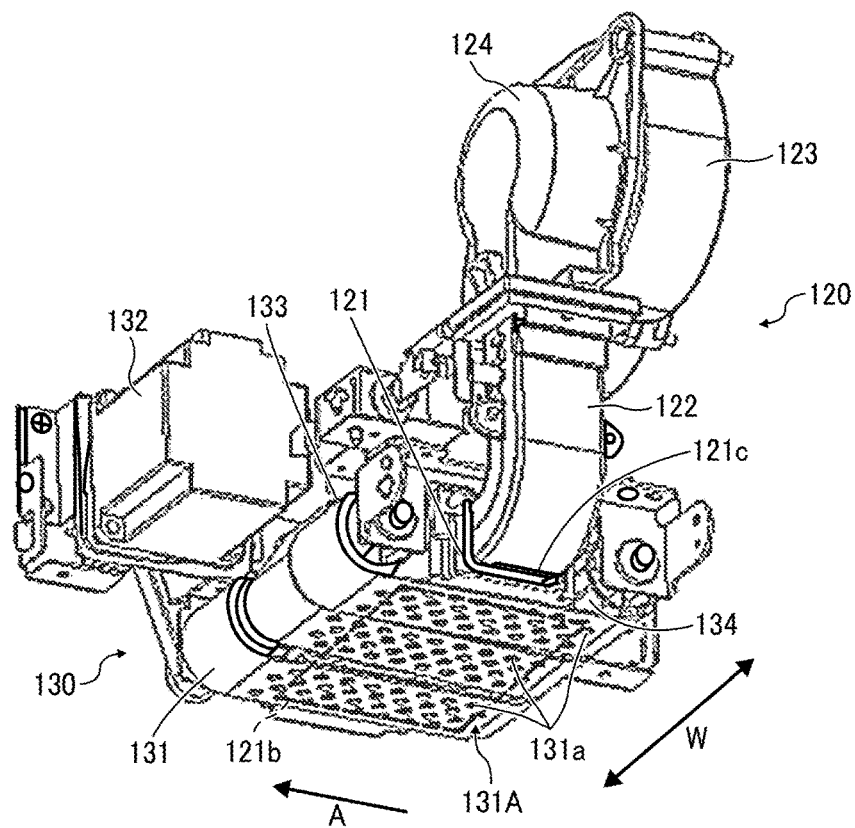
FIG. 3 is a perspective view illustrating an embodiment of a first suction unit (suction aspirator) and a conveyance device.

As illustrated in FIGS. 1 and 3, the first suction unit 120 includes the suction chamber 121, a suction duct 122, a suction fan 123, and a first driver 124. The first suction unit 120 is positioned above the conveyed medium 101 stacked on the stacker 110. The first suction unit 120 drives the first driver 124 to rotate the suction fan 123, so that the suction chamber 121 generates a negative pressure via air aspiration, which is a so-called chamber method. The first suction unit 120 attracts the topmost conveyed medium 101A of the stacked conveyed media 101 via the generated negative pressure. The suction chamber 121 is disposed inside the conveyance device 130, and air communicates from an opening 121b formed in a bottom 121a via multiple small-diameter holes 131a formed in the conveyance device 130 to a lower space. A hole 121c is formed in one side in the direction perpendicular to the conveyance direction W of the suction chamber 121. The hole 121c is connected to the suction fan 123 and the first driver 124 via the suction duct 122.

In the first suction unit 120, the first driver 124 rotates the suction fan 123, so that the air is removed from the bottom of the conveyance device 130 and the removed air is discharged outside the first suction unit 120 via the suction chamber 121, the suction duct 122, the suction fan 123, and the first driver 124. As illustrated in FIG. 1, a reference "aw" illustrates a flow of air or removed air generated by operation of the first suction unit 120. The first suction unit 120 includes an electrically operated shutter device 126 that opens and closes the suction duct 122 or the suction chamber 121. The shutter device 126 is operated to open or close by a shutter driver 171. The first suction unit 120 is configured such that the suction force exerted by the air flow "aw" is exerted on a leading end 101Aa of the conveyed medium 101A due to an operation of the shutter driver 171 when the first driver 124 is operated. Naturally enough, without providing the shutter device 126 or the shutter driver 171, the suction force can be exerted to the conveyed medium 101A by turning on or off the first driver 124. However, there is a time lag from the start of rotation of the suction fan 123 to the generation of the suction force or the negative pressure to attract the conveyed medium 101A. As a result, while the first driver 124 is retained to be driven, the shutter driver 171 turns on or off the shutter device 126, to thereby adjust a timing with which the suction force is exerted. This method is preferable for a higher speed operation.

The first suction unit 120 is not limited to the embodiments illustrated in FIGS. 1 and 3, but may have another structure. For example, the first suction unit 120A as illustrated in FIG. 4 does not include a suction duct 122 compared to the first suction unit 120 illustrated in FIG. 3.

Figure 4:
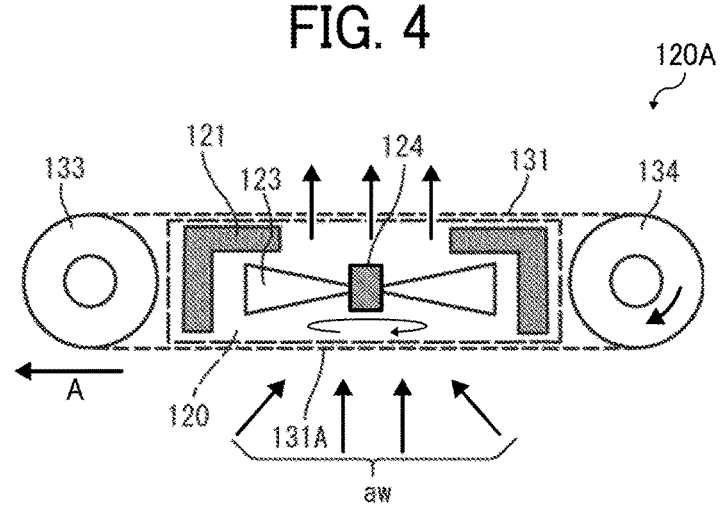
FIG. 4 schematically illustrates another embodiment of the first suction unit.

In a case of using the first suction unit 120A, the first driver 124 rotates the suction fan 123, so that the air is attracted from a part lower than the suction fan 123 as illustrated in FIG. 4 and is discharged upward in FIG. 4. As a result, a negative pressure is generated inside the suction chamber 121, and the leading end 101Aa of the conveyed medium 101A is attracted.

As illustrated in FIG. 1, the conveyance device 130 includes a conveyance belt 131 to convey the conveyed medium 101 by a suction force being a negative pressure generated by the first suction unit 120, and a belt drive motor 132 as a belt driver to rotate the conveyance belt 131. The conveyance belt 131 includes multiple small-diameter holes 131a, through which the air flow "aw" generated by the first suction unit 120 passes. The conveyance belt 131 is supported with tension between at least two rollers 133 and 134. The belt drive motor 132 drives to rotate one of the two rollers 133 and 134, so that the conveyance belt 131 rotates in the clockwise direction as illustrated in FIGS. 1 and 3. In the present embodiment, the belt drive motor 132 drives to rotate the roller 133. The conveyance device 130 attracts the topmost medium 101A attracted upward by the first suction unit 120 on a suction face 131A of the conveyance belt 131 opposed to the conveyed medium 101A. The belt drive motor 132 drives and the conveyed medium 101A attracted by the suction face 131A is conveyed in the conveyance direction A.

Figure 5:
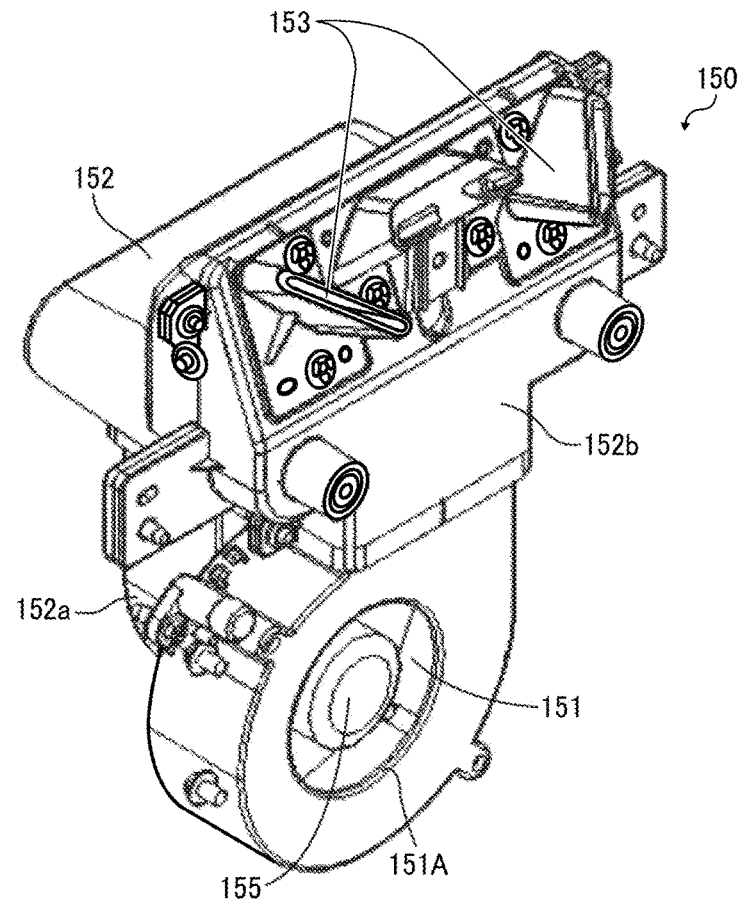
FIG. 5 is a perspective view illustrating a structure of a separator.

As illustrated in FIG. 1, the fan 150 blows an air flow "fw" as air to a leading end 101Aa of the topmost conveyed medium 101A at a matched timing with which the first suction unit 120 attracts the topmost conveyed sheet 101A stacked on the stacker 110. The fan 150 blows the air flow "fw" against the leading end 101Aa of the topmost conveyed medium 101A, so that the air flow "fw" is introduced between the conveyed medium 101A and the conveyed medium 101 disposed below the conveyed medium 101A, to thereby float the conveyed medium 101A toward the conveyance device 130. Herein, a reference 101Ab denotes a trailing end of the conveyed medium 101A in the conveyance direction. As illustrated in FIGS. 1 and 5, the fan 150 includes a blast fan 151 that rotates driven by the fan drive motor 155, a blast duct 152 including an end 152a that connects to the blast fan 151, and a blast nozzle 153 that connects to another end 152b of the blast duct 152. The blast fan 151 of the fan 150 drives to rotate, so that the outside air is attracted from the opening 151A of the blast fan 151, and the air flow "fw" is discharged from the opening 151A of the blast nozzle 153 via the blast duct 152. The air flow "fw" is blown to the leading end 101Aa of the topmost conveyed medium 101A (and the conveyed medium 101 overlaid below the topmost conveyed medium 101A), the topmost conveyed medium 101A is away from the conveyed medium 101 disposed below due to a positive pressure of the air flow "fw" and floats upward. The first suction unit 120 disposed above the conveyed medium 101A attracts the conveyed medium 101A, thereby accelerating absorption of the topmost conveyed medium 101A toward the suction face 131A of the conveyance belt 131 of the conveyance device 130.

As illustrated in FIG. 1, the fan 150 includes an electrically operated shutter device 156 that opens and closes the blast duct 152 or the blast nozzle 153. The shutter device 156 is operated to open or close by a fan shutter driver 172. The fan 150 is configured such that the air flow "fw" is blown from the blast nozzle 153 when the fan shutter driver 172 is turned on or off in a state in which the fan drive motor 155 is operated. Naturally enough, without providing the shutter device 156 or the fan shutter driver 172, the air flow "fw" can be blown to the leading end 101Aa of the conveyed medium 101A by turning on or off the fan drive motor 155, but there is a time lag between the start of the rotation of the blast fan 151 and the time when the amount of air necessary to separate the conveyed medium 101A has been generated. As a result, it is preferable that the timing to blow the air flow "fw" be adjusted by opening or closing the shutter device 156 by the fan shutter driver 172. That is, the fan 150 is disposed at the first suction unit 120 and blows the air flow "fw" being a separating air to the leading end 101Aa of the conveyed media 101, 101A before absorption.

Figure 6:
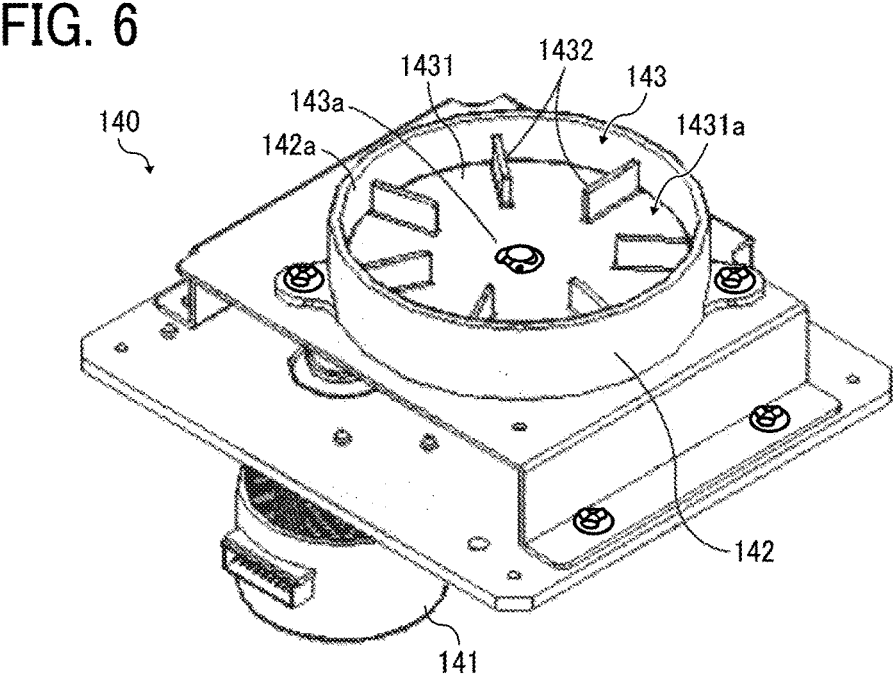
FIG. 6 is a perspective view illustrating an embodiment of a second suction unit.

The second suction unit 140 as an attracting device includes a rotary fan 143, a second driver 141 that rotates the rotary fan 143, and a housing 142 that covers a circumference of the rotary fan 143. As illustrated in FIG. 6, an opening 142a is formed at one end of the housing 142. The rotary fan 143 includes a planar board 1431, and a plurality of rib-shaped blades 1432 as a plurality of walls disposed radially on one planar face 143a of the board 1431. The second suction unit 140 is disposed such that the opening 142a of the rotary fan 143 is directed toward the conveyed medium 101 as a suction target as illustrated in FIG. 1. In the present embodiment, the opening 142a is so disposed as to face, from above, the topmost conveyed medium 101A of the conveyed media 101 disposed on the stacker 110. The second suction unit 140 generates a vortex flow "bw" when the second driver 141 causes the rotary fan 143 to rotate, and attracts the conveyed medium 101A positioned in the suction target direction by a vortex flow suction method or a vortex method. In the present embodiment, the second suction unit 140 includes the housing 142; however, without the housing 142 disposed on the circumference of the rotary fan 143, the vortex flow "bw" can still be generated. As a result, the second suction unit 140 may not include the housing 142. Alternatively, the second suction unit 140 may include a shutter device to open or close the opening 142a of the housing 142 and a second shutter driver to cause the shutter device to open or close, so that the shutter device can be open or closed with the rotary fan 143 kept rotating. With this structure, the timing of the vortex flow "bw" to be exerted to the conveyed medium 101A can be adjusted.

Figure 7A:
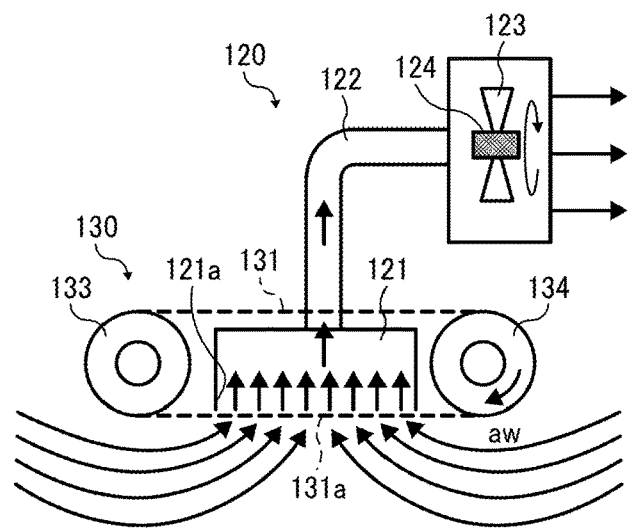
FIG. 7A schematically illustrate an air flow due to operation of the first suction unit.
Figure 7B:
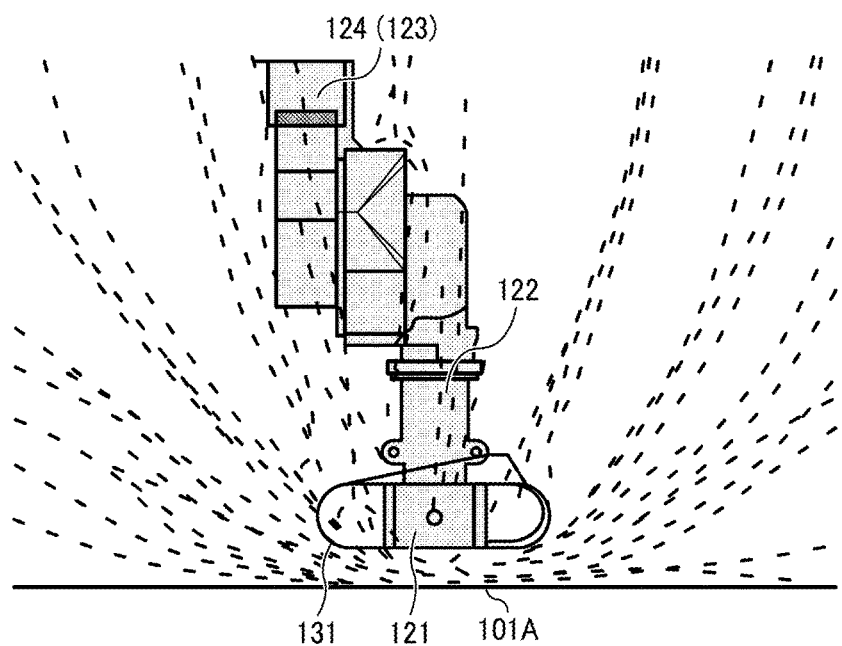
FIG. 7B illustrates a flow velocity chart showing an analysis result of the flow of air due to operation of the first suction unit.

Referring to FIGS. 7A and 7B and FIGS. 8A and 8B, the flow of air due to the first suction unit 120 and the second suction unit 140 will be described. As illustrated in FIG. 7A, when the suction fan 123 in the first suction unit 120 rotates, negative pressure is generated to the suction chamber 121 and the air below the conveyance device 130 is attracted from the multiple small-diameter holes 131a of the conveyance belt 131. As a result, the air flow "aw" is generated, and a suction force is exerted to the conveyed medium 101A. However, the first suction unit 120 attracts the air from the small-diameter holes 131a of the conveyance belt 131 of the conveyance device 130, the air around the small-diameter holes 131a is attracted from the whole space, and the suction force exerted to the away-disposed conveyed medium 101 becomes weak. Specifically, in the suction structure employing the chamber method to generate a negative pressure within the suction chamber 121 by suctioning air from various directions, the suction force to attract the away-disposed suction target is weak. As a result, in the first suction unit 120, when the air flow "fw" blown from the fan 150 lifts the topmost conveyed medium 101A as a suction target to separate the conveyed medium 101, a distance to the conveyed medium 101A becomes shorter and the conveyed medium 101A can be attracted easily. Specifically, the first suction unit 120 can attract the suction target disposed at a relatively away position because the air flow "fw" from the fan 150 provides a support. FIG. 7B illustrates a flow velocity chart of the air flow "aw" when a model of the first suction unit 120 is formed software-wise by a computer, and the formed model is analyzed using analysis simulation software. It is understood from the flow velocity chart that, in the first suction unit 120 employing the chamber method suction unit, the flow velocity curves are attracted widely from the whole space to the suction chamber 121.

Figure 8A:
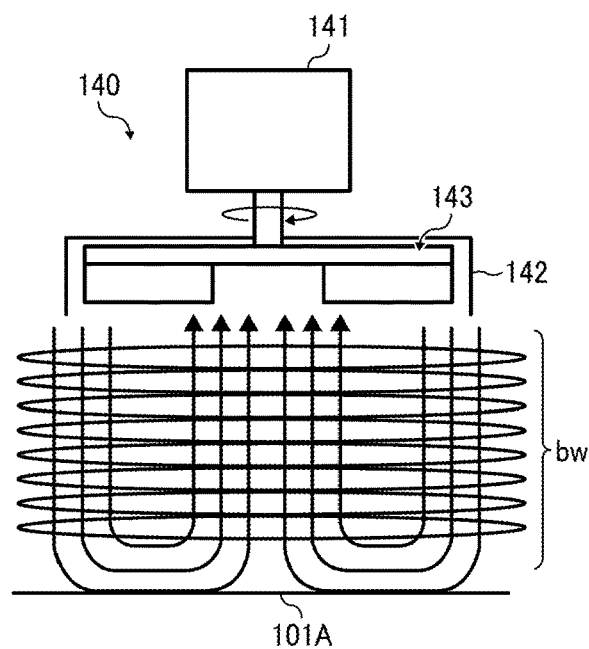
FIG. 8A schematically illustrates a vortex flow being an air flow caused by operation of the second suction unit.
Figure 8B:
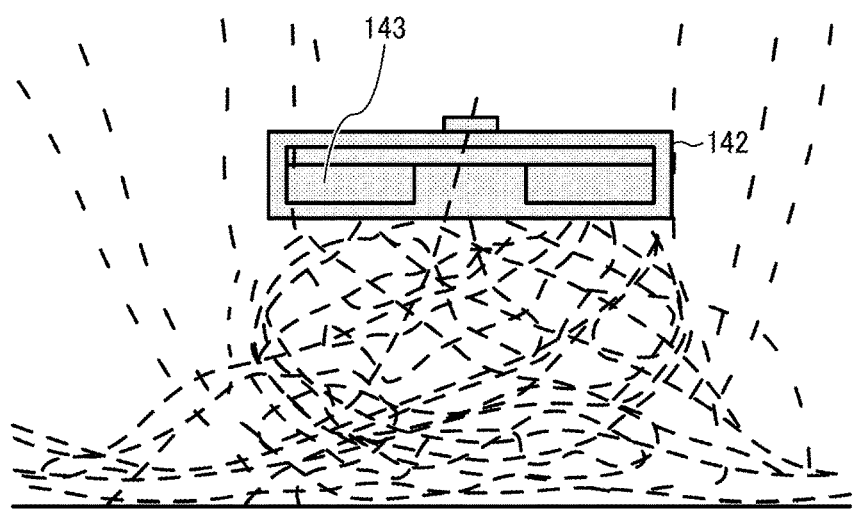
FIG. 8B illustrates a flow velocity chart showing an analysis result of the flow of air due to operation of the second suction unit.

Contrarily, as illustrated in FIG. 8A, in the second suction unit 140, the rotary fan 143 including radially disposed blades 1432 rotates, so that the vortex flow "bw" is generated below the rotary fan 143. As a result, negative pressure is generated in a center portion 143a of the rotary fan 143 corresponding to the center portion of the vortex flow "bw," and the topmost conveyed medium 101A is attracted. This vortex flow "bw" is generated mainly just below the blade 1432, and so, the suction target (or the conveyed medium 101A) disposed relatively away from the rotary fan 143, can be given a suction force. And the suction target (or the conveyed medium 101A) disposed away from the first suction unit 120 can be attracted without any support from the air flow "fw" from the fan 150. FIG. 8B is a flow velocity chart of the vortex flow "bw" when the model of the second suction unit 140 is software-generated, and the generated model is analyzed by analysis simulation software. As illustrated in this flow velocity chart, the second suction unit 140 employing a vortex suction method shows that the flow velocity has a higher density in a space below the rotary fan 143, and the vortex flow "bw" is formed and attracted.

As illustrated in FIG. 2, a side air nozzle 180 to blow side air is disposed at one of the side fences 112 and 112 in the depth. The side air blows air via the side air nozzle 180 from one side in the direction perpendicular to the conveyance direction W to separate each medium contacting each other among the stacked conveyed media 101. The side air nozzle 180 is connected to a side blower 190 (see FIG. 11) that generates an air flow. The air flow generated by the side blower 190 is supplied via a duct.

Figure 9:
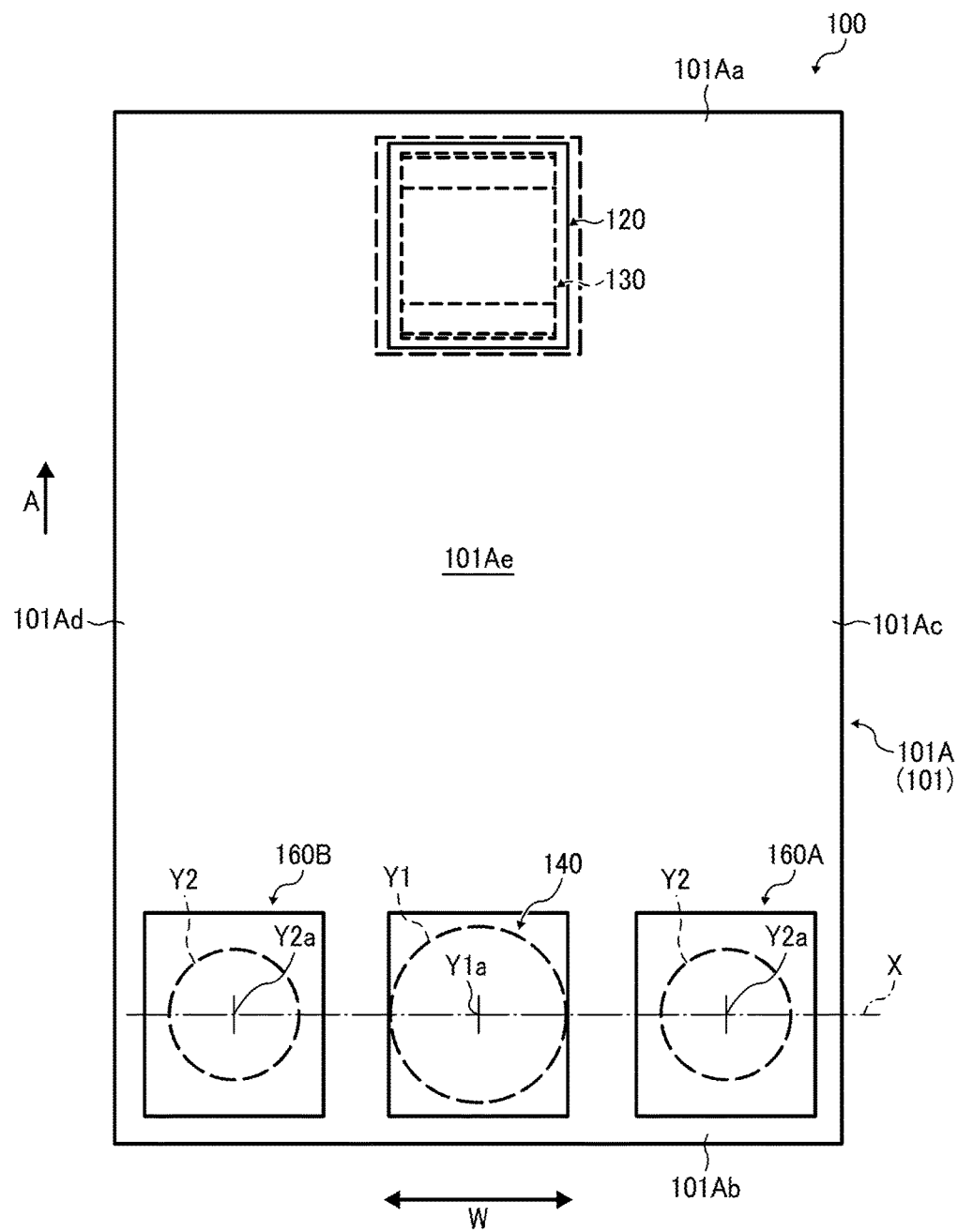
FIG. 9 is a plan view illustrating positioning of a third suction unit.

As illustrated in FIG. 9, the third suction units 160A and 160B are disposed above the conveyed medium 101 stacked on the stacker 110 and in the direction perpendicular to the conveyance direction W perpendicular to the conveyance direction A of the conveyed medium 101. The third suction units 160A and 160B are disposed parallel to the second suction unit 140 in the direction perpendicular to the conveyance direction W. The second suction unit 140 is disposed at a center 101Ae of the conveyed medium 101A. More specifically, in this parallel position, the removal centers Y1a, Y2a, and Y2a of removal areas Y1, Y2, and Y2 of the second suction unit 140 and the third suction units 160A and 160B, respectively, are on a same line X extending in the direction perpendicular to the conveyance direction W. The third suction unit 160A attracts an end 101Ac of the conveyed medium 101A positioned in the direction perpendicular to the conveyance direction W and the suction unit 160B attracts another end 101Ad of the conveyed medium 101A positioned in the direction perpendicular to the conveyance direction W. In the present embodiment, the third suction units 160A and 160B are positioned at a trailing end 101Ab of the conveyed medium 101A; however, the suction units 160A and 160B may be positioned at a leading end 101Aa of the conveyed medium 101A. In this case, the fan 150 and the first suction unit 120 are positioned at the trailing end 101Ab of the conveyed medium 101A and the second suction unit 140 is positioned at the leading end 101Aa of the conveyed medium 101A.

Figure 10:
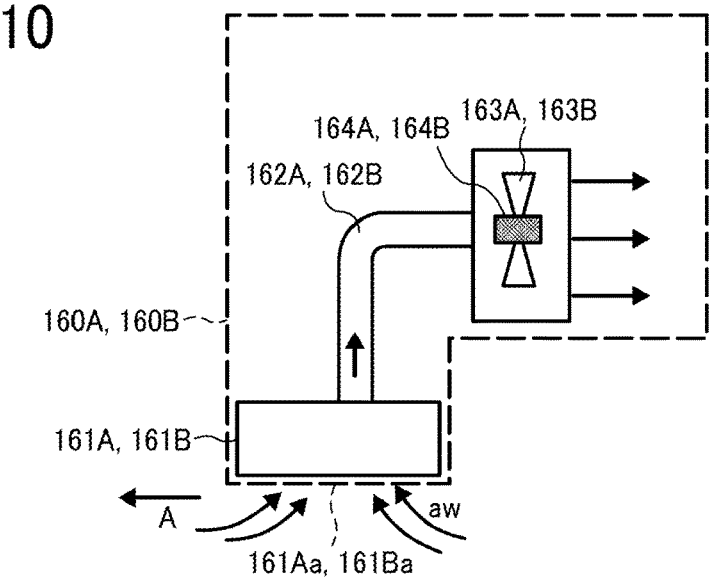
FIG. 10 schematically illustrates an embodiment of the third suction unit.

The third suction units 160A and 160B are similarly structured, but each may have a different structure from each other. The third suction units 160A and 160B may have the same structure as that of the first suction unit 120 or the second suction unit 140. In the present embodiment, the third suction units 160A and 160B each have the same structure as that of the first suction unit 120. Specifically, as illustrated in FIG. 10, the third suction units 160A and 160B include suction chambers 161A and 161B, suction ducts 162A and 162B, suction fans 163A and 163B, and third drivers 164A and 164B. The third suction units 160A and 160B drive the third drivers 164A and 164B to rotate the suction fans 163A and 163B, so that suction chambers 161A and 161B generate a negative pressure by the chamber aspiration method. The third suction units 160A and 160B attract the ends 101Ac and 101Ad of the topmost conveyed medium 101A of the stacked conveyed media 101 via the generated negative pressure. The shutter device 126 is not provided to the third suction units 160A and 160B, though, differently from the first suction unit 120, but any similar device to the shutter device 126 can be provided. The suction chambers 161A and 161B include bottoms 161Aa and 161Ba, each including an opening 161Ab or 161Bb. The suction chambers 161A and 161B communicate the suction fans 163A and 163B and the third drivers 164A and 164B via the suction ducts 162A and 162B.

Figure 11:
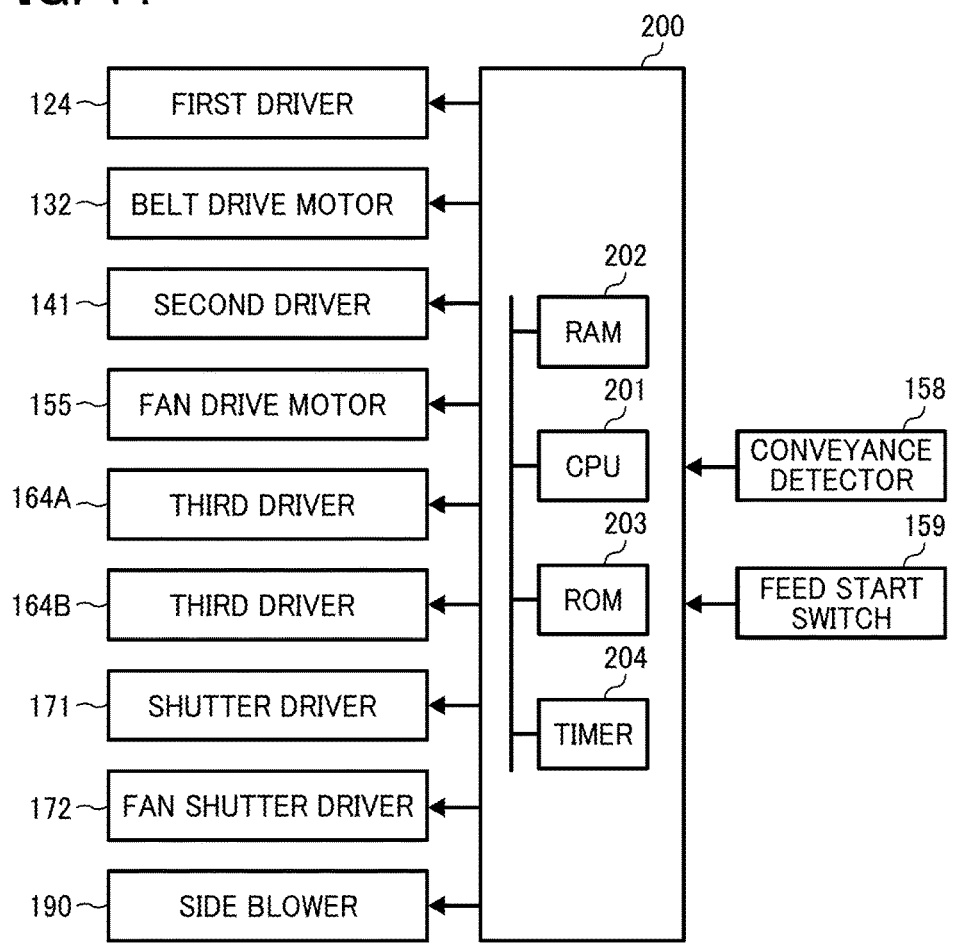
FIG. 11 is a block diagram illustrating an embodiment of a control system of the feeding device according to the first embodiment of the present disclosure.
Figure 12:
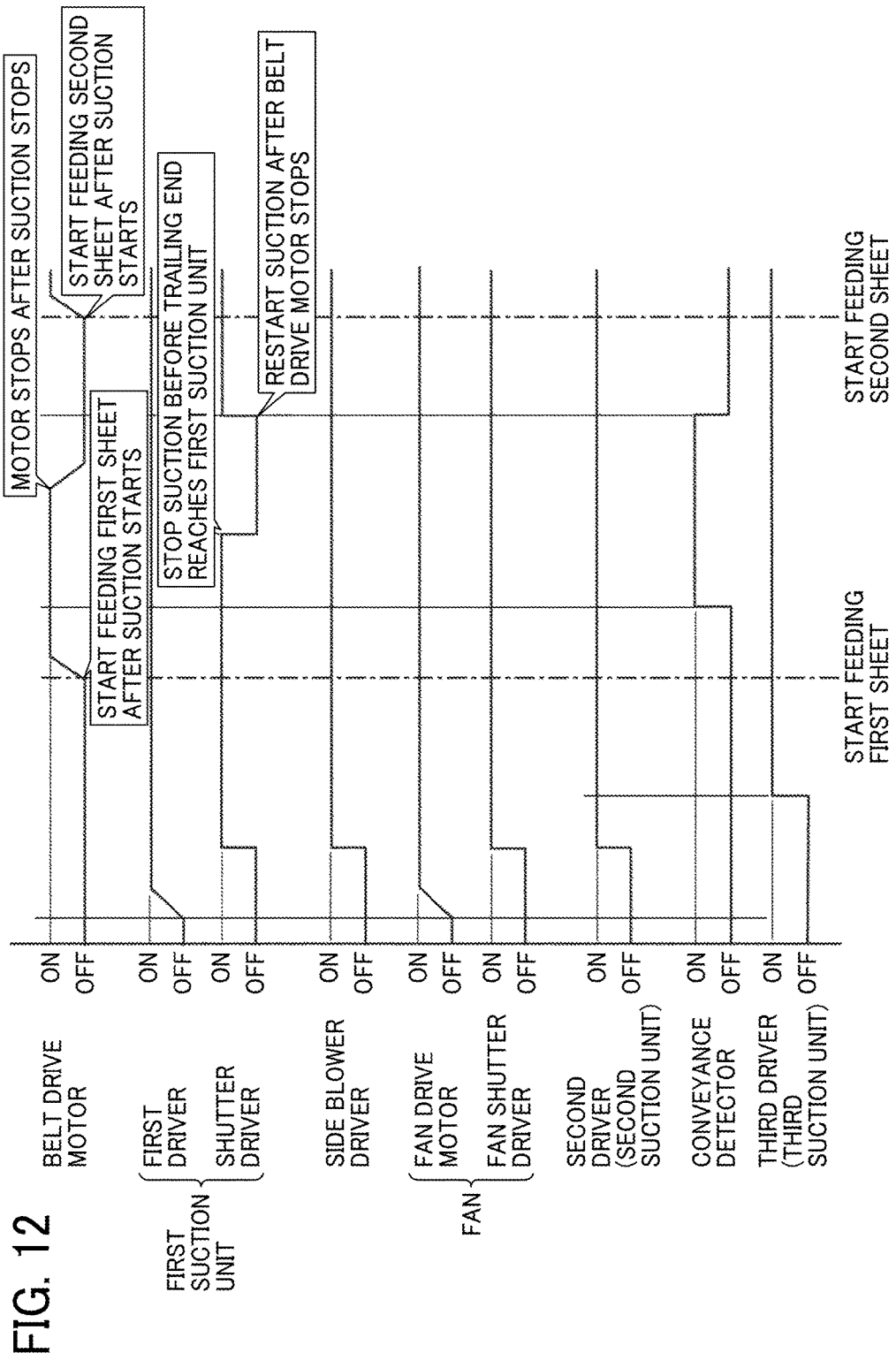
FIG. 12 is a timing chart illustrating operation of each part in the feeding device according to the present disclosure.
Figure 14A:
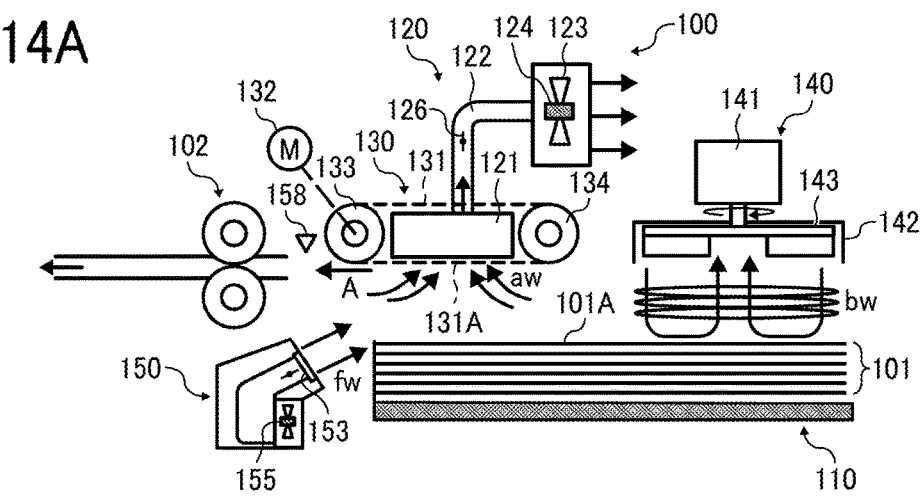
FIGS. 14A to 14C each schematically illustrate operation and process from separation to suction of a conveyed medium during a feeding process performed by the first and second suction units.
Figure 14B:
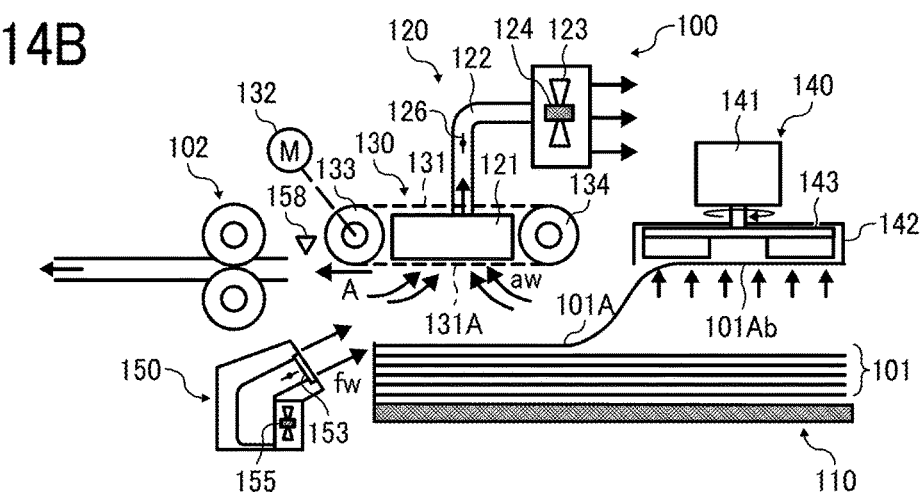
Figure 14C:
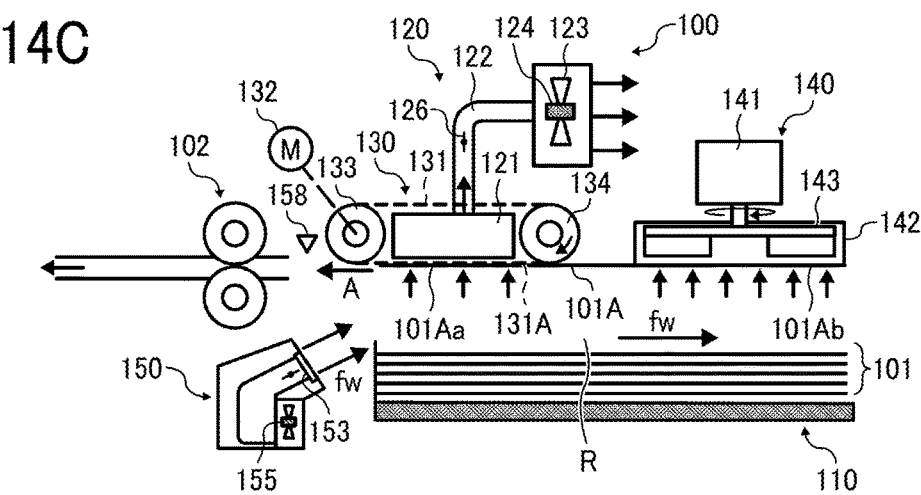
Figure 15A:
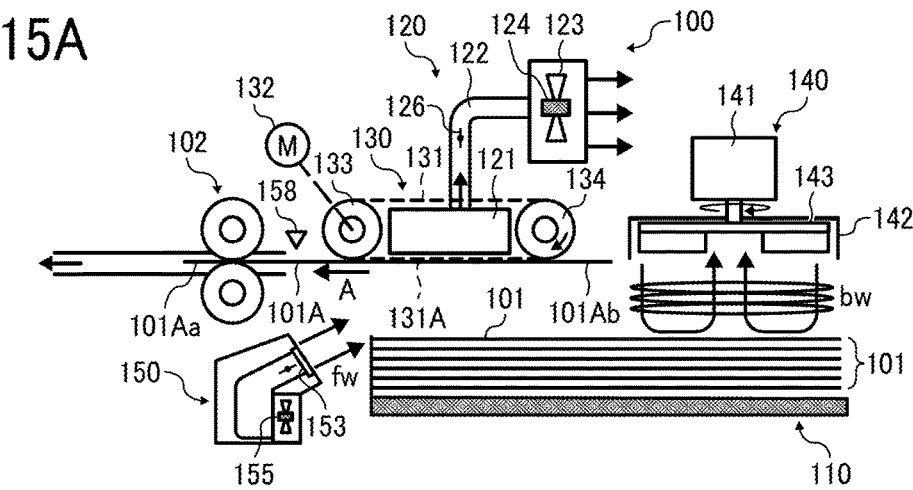
FIGS. 15A to 15C each schematically illustrate operation and process from separation to suction of a second conveyed medium during a feeding process by the first and second suction units.
Figure 15B:
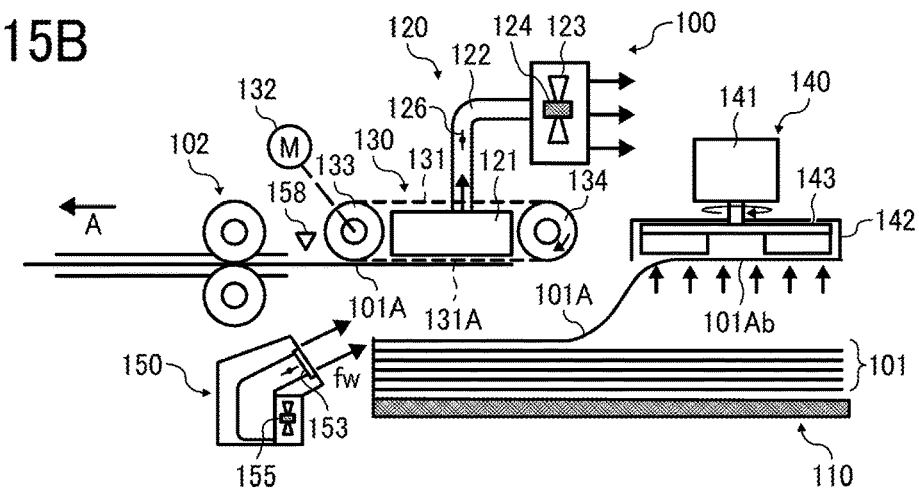
Figure 15C:
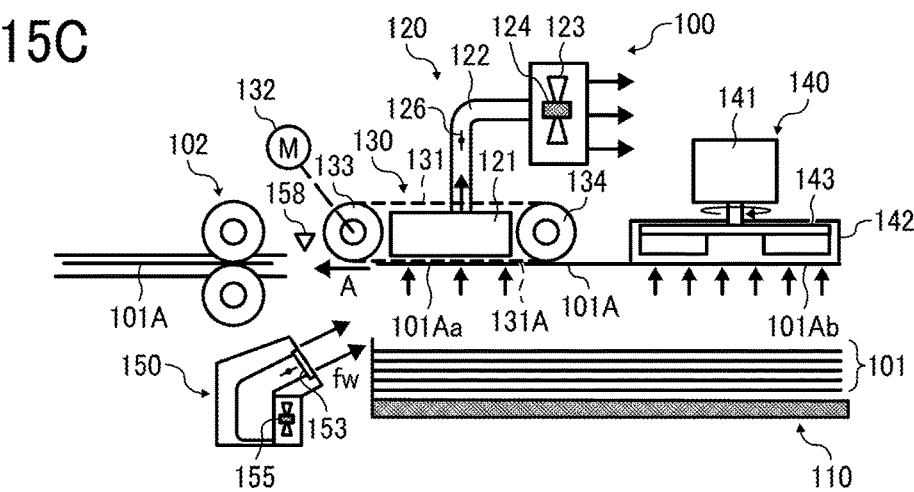
Figure 16A:
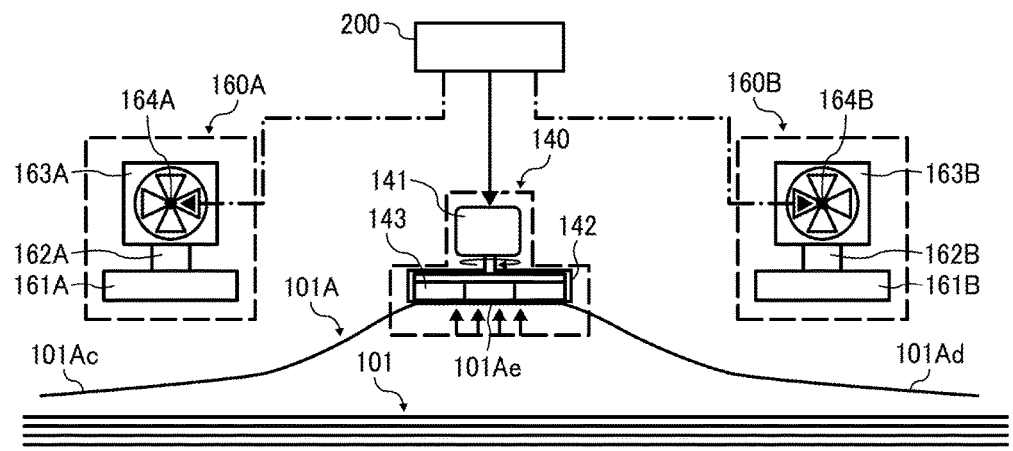
FIGS. 16A and 16B each illustrate a suction state of the conveyed medium at a trailing end thereof.
Figure 16B:
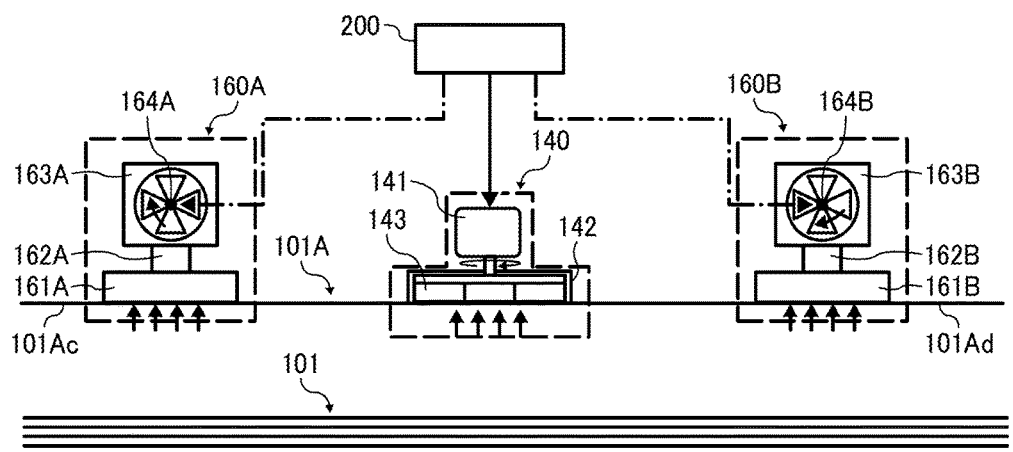

Next, a structure of the control system and operational flow of each part by a controller 200 according to the first embodiment will be described. FIG. 11 is a block diagram illustrating a functional structure of a controller 200 according to the first embodiment; and FIG. 12 illustrates an operational timing chart of each part of the feeding device 100. In FIG. 11, the controller 200 includes a computer that includes a central processing unit (CPU) 201, a random-access memory (RAM) 202, a read-only memory (ROM) 203, and a timer 204. At an input side of the controller 200, a conveyance detector 158 to detect a state of conveyance of the conveyed medium 101 and a feed start switch 159 to input a feed start signal are connected to the controller 200 via signal lines. The conveyance detector 158 is disposed downstream of the first suction unit 120 and is formed of a sensor to optically detect the conveyed medium 101A. At an output side of the controller 200, the first driver 124, the belt drive motor 132, the second driver 141, the fan drive motor 155, the third drivers 164A and 164B, the shutter driver 171 and the fan shutter driver 172, and the side blower 190 are connected to the controller 200 via signal lines. Operation of the first driver 124, the belt drive motor 132, the second driver 141, the fan drive motor 155, the third drivers 164A and 164B, the shutter driver 171, the fan shutter driver 172, and the side blower 190 is controlled to be turned on and off by an operation timing stored in the ROM 203 of the controller 200. FIG. 13 illustrates a flowchart of absorption and conveyance control by the controller 200 of the feeding device 100 according to the first embodiment. FIGS. 14A to 14C, FIGS. 15A to 15C, and FIGS. 16A and 16B illustrate operation and processes from separation to conveyance of the feeding device 100 according to the embodiments of the present disclosure. FIGS. 15A to 15C illustrate operation performed after the operation performed in FIG. 14C. FIGS. 16A and 16B illustrate attracting operation of the conveyed medium 101A at the trailing end 101Ab of the conveyed medium 101A.

When the feed start switch 159 is operated and the feed start signal is input in Step ST1, the controller 200 operates the first driver 124 and the fan drive motor 155 in Step ST2, and the process goes to Step ST3. In Step ST3, the controller 200 operates the side blower 190, the shutter driver 171, the fan shutter driver 172, and the second driver 141. In Step ST4, the controller 200 operates the third drivers 164A and 164B after the second driver 141. As a result, as illustrated in FIG. 14A, the air flow "fw" is blown to the leading end 101Aa of the conveyed medium 101 from a blast nozzle 153 of the fan 150, and the side air is blown to the side end of the conveyed medium 101 from the side air nozzle 180. In addition, the air flow "aw" is generated in the first suction unit 120 and the vortex flow "bw" is generated in the second suction unit 140, and a suction force is generated due to the negative pressure. In the present embodiment, as illustrated in FIG. 12, the shutter driver 171 of the first driver 124 and the second driver 141 are operated at the same time; however, the second driver 141 can be operated before the start of the shutter driver 171. As a result, the rotary fan 143 is rotated and the air at the trailing end 101Ab of the conveyed medium 101A can be attracted.

When the second driver 141 is started to operate, a stronger suction force than that of the first suction unit 120 is generated in the second suction unit 140. In addition, the second suction unit 140 is disposed upstream of the first suction unit 120 in the conveyance direction and in the center 101Ae of the conveyed medium 101A. Accordingly, the suction force of the second suction unit 140 exerts to the center 101Ae of the trailing end 101Ab of the topmost conveyed medium 101A in the stacker 110, so that the center 101Ae of the trailing end 101Ab of the conveyed medium 101A floats and is attracted as illustrated in FIGS. 14B and 16A. In addition, when the third drivers 164A and 164B operate, a suction force is exerted to the ends 101Ac and 101Ad positioned in the direction perpendicular to the conveyance direction W of the conveyed medium 101A and the ends 101Ac and 101Ad are raised as illustrated in FIG. 16B. That is, the third drivers 164A and 164B start attracting the ends 101Ac and 101Ad after the start of attracting the center 101Ae of the conveyed medium 101A by the second suction unit 140. Together with floating of the trailing end 101Ab, as illustrated in FIG. 14C, a suction force of the first suction unit 120, the air flow "fw" blown to the leading end 101Aa from the fan 150 and the air flow from the side air nozzle 180 are blown to the conveyed medium 101. With these air flows, the leading end 101Aa and the side of the conveyed medium 101 are floated and are attracted to the suction face 131A of the conveyance belt 131, and the topmost conveyed medium 101A is separated from the conveyed medium 101 stacked below. In this case, the trailing end 101Ab of the conveyed medium 101A is attracted by the second suction unit 140 and the third suction units 160A and 160B, so that an air path R through which the air flow "fw" blown from the fan 150 passes is formed between the topmost conveyed medium 101A and the conveyed medium 101 positioned below. Therefore, there is no need of waiting for arrival of the trailing end 101Ab and the separation time can be reduced. In addition, the first conveyed medium 101A can stand by while being attracted to the conveyance belt 131 and does not contribute to the productivity, so that the first conveyed medium 101A can be attracted by the first suction unit 120 in advance. In addition, the trailing end 101Ab receives a suction force not only in the center 101Ae but also in the ends 101Ac and 101Ad positioned in the direction perpendicular to the conveyance direction W.

After the start of absorption of the conveyed medium 101, the controller 200 operates the belt drive motor 132 in Step ST5 in FIG. 13. At this timing, the topmost conveyed medium 101A (i.e., the first sheet) is started to be conveyed.

As illustrated in FIGS. 14C and 15A, when the belt drive motor 132 is operated, the conveyance belt 131 rotates clockwise, the conveyed medium 101A attracted to the suction face 131A is conveyed in the conveyance direction A, and the leading end 101Aa is conveyed to the conveyance roller pair 102 disposed downstream of the first suction unit 120. At this time, the second suction unit 140 continues to operate without stopping absorption. As illustrated in FIG. 15B, when the trailing end 101Ab of the first sheet of the conveyed medium 101A passes through the second suction unit 140 (and the conveyance detector 158 is turned on and a predetermined time has passed), and immediately after that, the trailing end 101Ab of the second topmost conveyed medium 101A is attracted. That is, the controller 200 determines whether the conveyance detector 158 is turned on in Step ST6 in FIG. 13. Here, when the conveyance detector 158 is on, and after a predetermined time has passed, the controller 200 determines that the first conveyed medium 101A has been fed properly. Then, the process goes to ST7, ST8, and ST9. The controller 200 stops operation of the shutter driver 171 of the first suction unit 120 in Step ST7, stops operation of the third drivers 164A and 164B in Step ST8, stops operation of the belt drive motor 132 in Step ST9, and the process goes on to Step ST10. When it is determined that the conveyance detector 158 is turned off in Step ST10, the controller 200 proceeds to Step ST11. That is, during the processes from ST 6 to ST10, the controller 200 detects a position of the trailing end 101Ab of the first conveyed medium 101A; before the trailing end 101Ab passes through the suction chamber 121 (that is, when the predetermined time has elapsed since the conveyance detector 158 turned on), the controller 200 stops operation of the shutter driver 171 of the first suction unit 120, to thereby close the shutter device 126 and stop the suction force, and stops the suction force of the third suction units 160A and 160B. This is to prevent the second conveyed medium 101A from being attracted and conveyed at the same time.

The controller 200 determines whether the trailing end 101Ab of the first conveyed medium 101A passes through the conveyance device 130 in Step ST10. When it is determined that the conveyance detector 158 is turned off, the controller 200 determines that the trailing end 101Ab of the first conveyed medium 101A has passed the conveyance device 130, and then, the process moves on to Step ST11. The controller 200 operates the shutter driver 171 of the first suction unit 120 in Step ST11. As a result, as illustrated in FIG. 15C, the first suction unit 120 resumes attraction the leading end 101Aa of the conveyed medium 101A.

Resumption of attraction by the first suction unit 120 does not mean the start of operation of the first driver 124. Instead, the shutter driver 171 is driven to open the shutter device 126, and the suction force is exerted to the conveyed medium 101A. This is because, when the start and the stop of the attraction are controlled by the operation of the first driver 124 alone, it takes time from the rotation of the suction fan 123 to the generation of the predetermined negative pressure. As a result, when the first conveyed medium 101A is to be attracted after the feed start signal input, the first driver 124 is operated and the suction force is exerted to the conveyed medium 101A; however, after the operation of the first driver 124 has already been started, the stop and restart of the suction force are preferably made by the open or close of the shutter device 126. By repeating such an operation, without causing any misfeed, the productivity may be improved than the conventional devices.

Figure 25A:
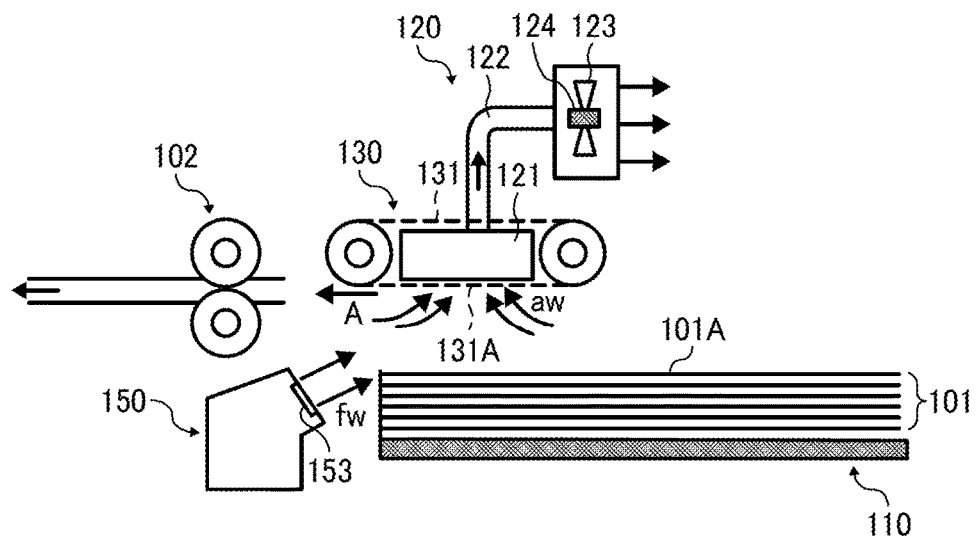
FIGS. 25A to 25D schematically illustrate operation and process of the feeding device including one suction unit from separation to conveyance of the medium.
Figure 25B:
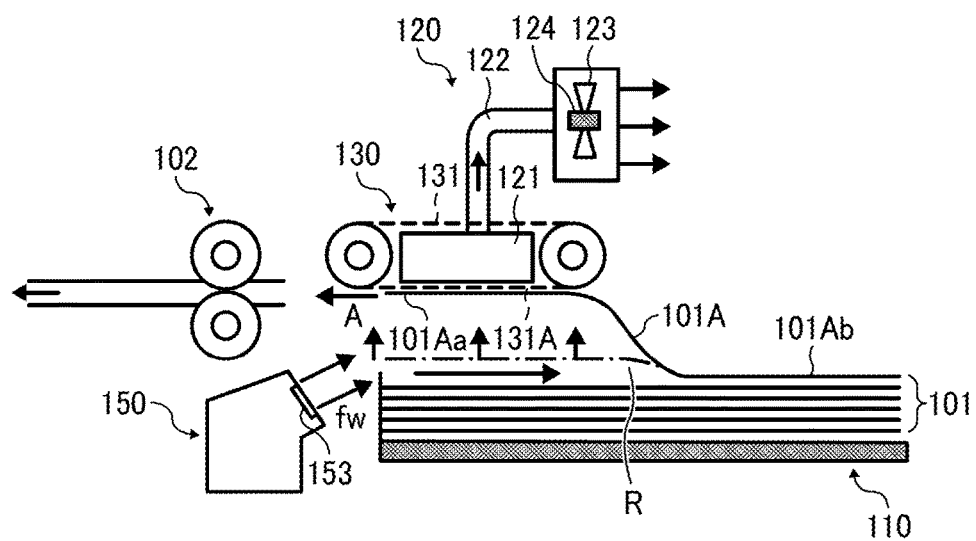
Figure 25C:
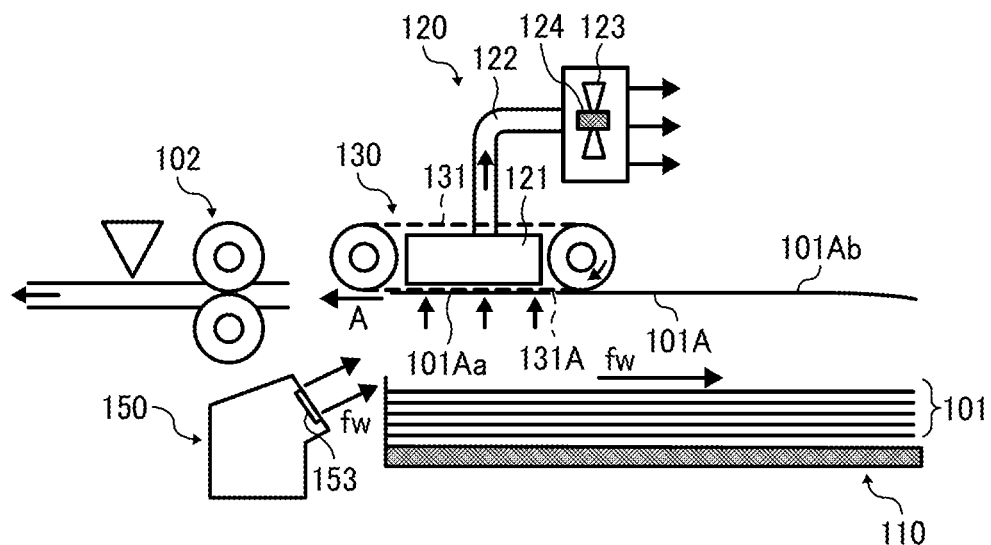
Figure 25D:
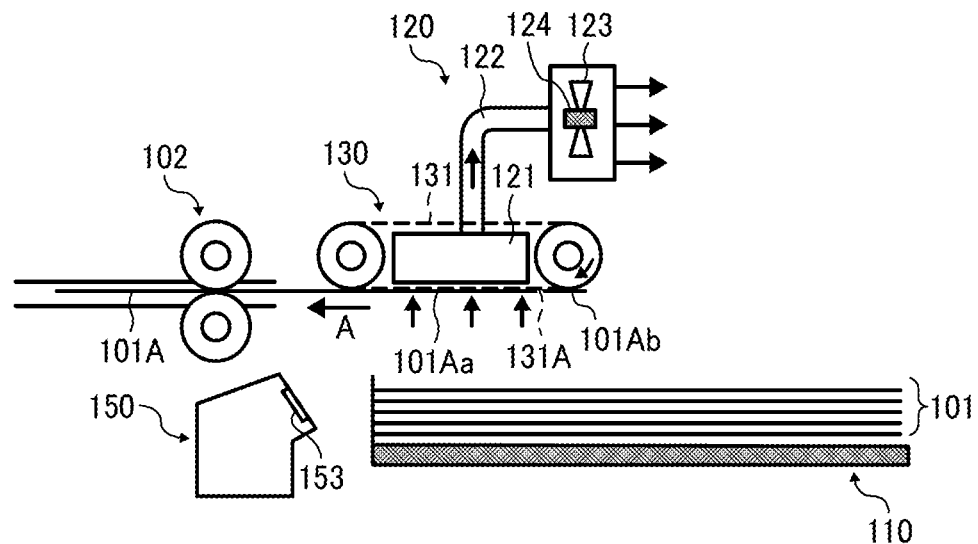
Figure 26A:
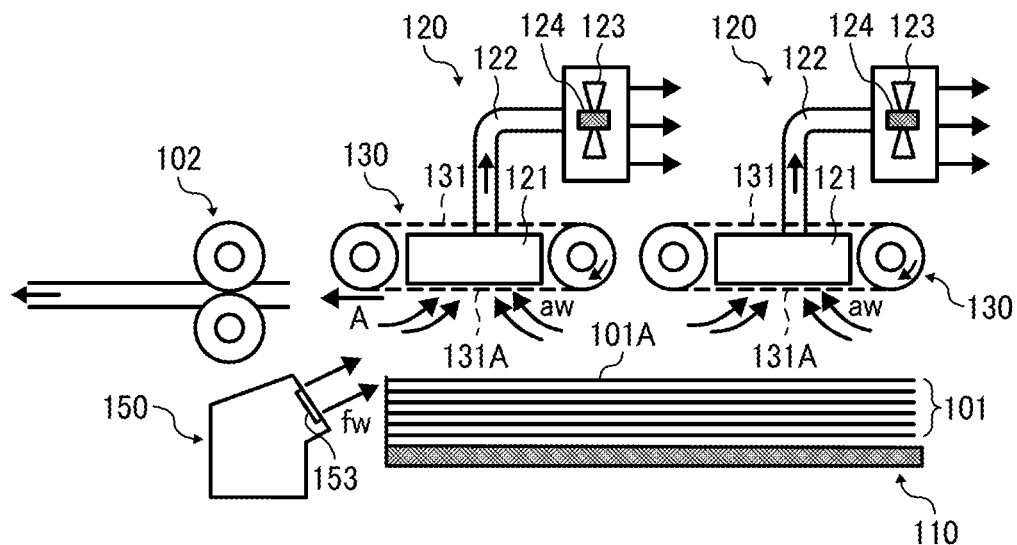
FIGS. 26A to 26D schematically illustrate operation and process performed by the feeding device including a plurality of first suction units from separation to conveyance.
Figure 26B:
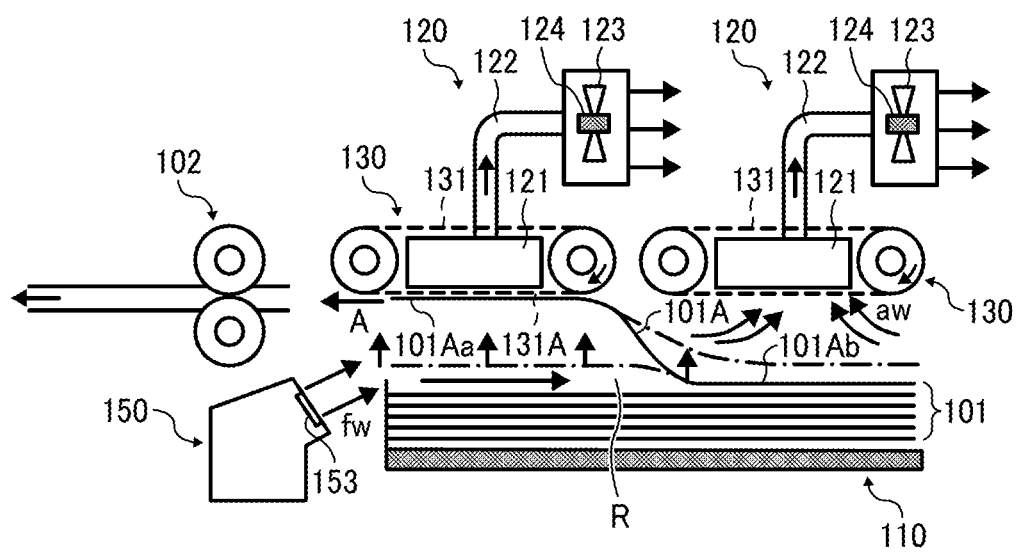
Figure 26C:
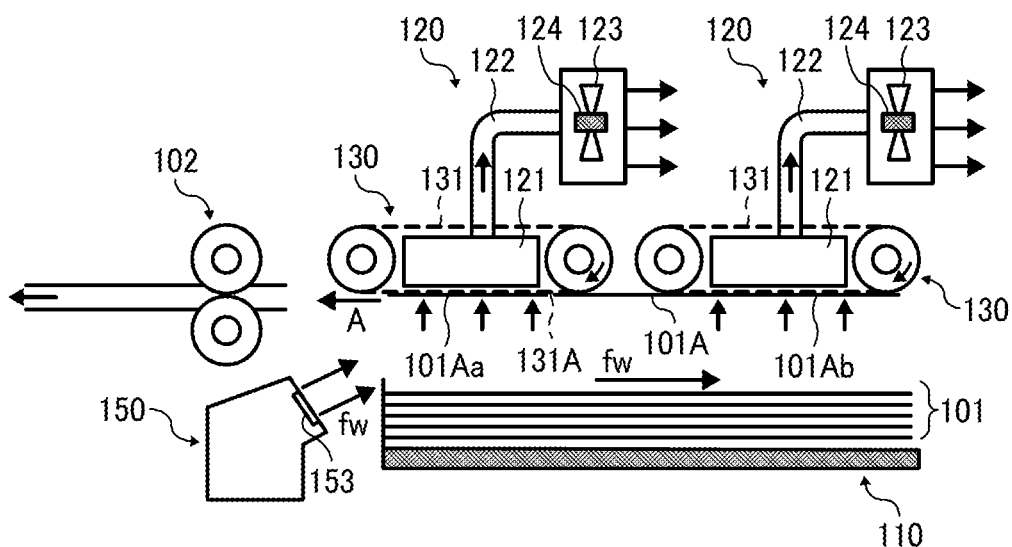
Figure 26D:
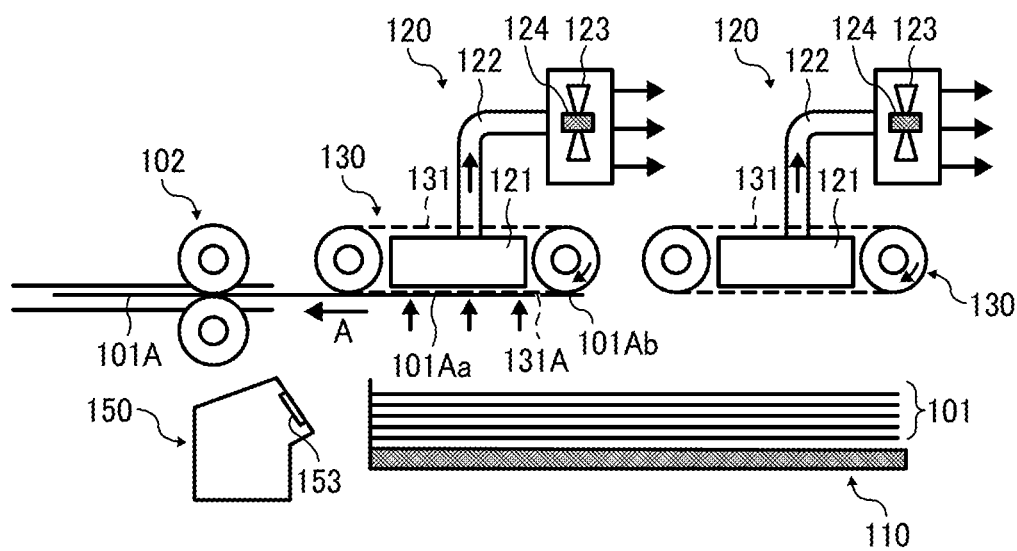

FIGS. 25A to 25D illustrates one of the background art structures including the first suction unit 120, the conveyance device 130, and the fan 150, in which the first suction unit 120 and the conveyance device 130 are disposed above the leading end 101Aa of the conveyed medium 101, and the conveyed medium 101 is separated from the following conveyed medium 101. In this structure, as illustrated in FIGS. 25A and 25B, the fan 150 blows the air flow "fw" for separation and the first suction unit 120 generates air flow "aw" to exert a suction force to the leading end 101Aa of the conveyed medium 101A. As a result, if the conveyance device 130 is operated before the air flow "fw" reaches the trailing end 101Ab of the conveyed medium 101A and the separation is fully complete, the following conveyed medium 101 tends to be moved by following the move of the conveyed medium 101A conveyed by the conveyance device 130. Accordingly, to prevent following movement, as illustrated in FIG. 25C, the conveyance device 130 may not be operated until the air flow "fw" reaches the trailing end 101Ab of the conveyed medium 101A and the separation completely ends. As illustrated in FIG. 25D, the conveyed medium 101A is not fed and there remained an issue to be improved with regard to the productivity. When comparing the structure as described above and the structure according to the first embodiment of the present disclosure, because the second suction unit 140 and the third suction units 160A and 160B each having a stronger suction force, attract in advance the trailing end 101Ab of the conveyed medium 101A, the air path R is formed. Then, before the air flow "fw" reaches the trailing end 101Ab of the conveyed medium 101A, separation of the trailing end 101Ab has been finished. Then, the conveyance device 130 can be operated earlier, and the separation time can be reduced while improving the suction performance and productivity. Further, the third suction units 160A and 160B attract the ends 101Ac and 101Ad of the conveyed medium 101, a large-sized conveyed medium 101 in the direction perpendicular to the conveyance direction W and the conveyed medium 101 with a heavy load in the trailing end 101Ab can be securely lifted and separated, and the feeding device 100 with excellent separability of the conveyed medium 101A can be provided.

As illustrated in FIGS. 26A to 26D, a background art structure includes suction devices disposed at the leading end and trailing end of the conveyed medium to attract the conveyed medium. These suction devices employ the chamber suction device that corresponds to the first suction unit 120, and attraction of the conveyed medium 101A from an away position is difficult, and it is difficult to float the trailing end 101Ab of the conveyed medium 101A before the leading end 101Aa. By contrast, the feeding device 100 according to the first embodiment includes the second suction unit 140 that is disposed near to the trailing end 101Ab of the conveyed medium 101 and employs the vortex method suction unit. Accordingly, the trailing end 101Ab of the conveyed medium 101A can be attracted from the away position, the time required for separation can be reduced while improving the attraction, the following conveyance due to the lack of separation can be prevented, and productivity can be improved. In the present embodiment, the third suction units 160A and 160B attract the ends 101Ac and 101Ad of the conveyed medium 101A. Accordingly, a large-sized conveyed medium 101 in the direction perpendicular to the conveyance direction W and the conveyed medium 101 with a heavy load in the trailing end 101Ab can be securely lifted and separated, and the feeding device 100 with excellent separability of the conveyed medium 101A can be provided.

In the present embodiment, the second suction unit 140 and the third suction units 160A and 160B are disposed such that the suction centers Y1$a$ and Y2$a$ of each of the suction area Y1 and Y2 are disposed on the same line X. However, for example, the suction center Y2$a$ of the third suction units 160A and 160B can be shifted to the conveyance direction A, or shifted to the opposite direction to the conveyance direction A. As to the shift amount, it is preferred that the suction area Y1 in which the suction force of the second suction unit 140 exerts to the conveyance direction A and the suction area Y2 in which the suction force of the third suction units 160A and 160B exert to the conveyance direction A, overlap. In attracting the conveyed medium 101 with a length in the conveyance direction A, the suction area Y1 and the suction area Y2 may not overlap.

Second Embodiment

Figure 18:
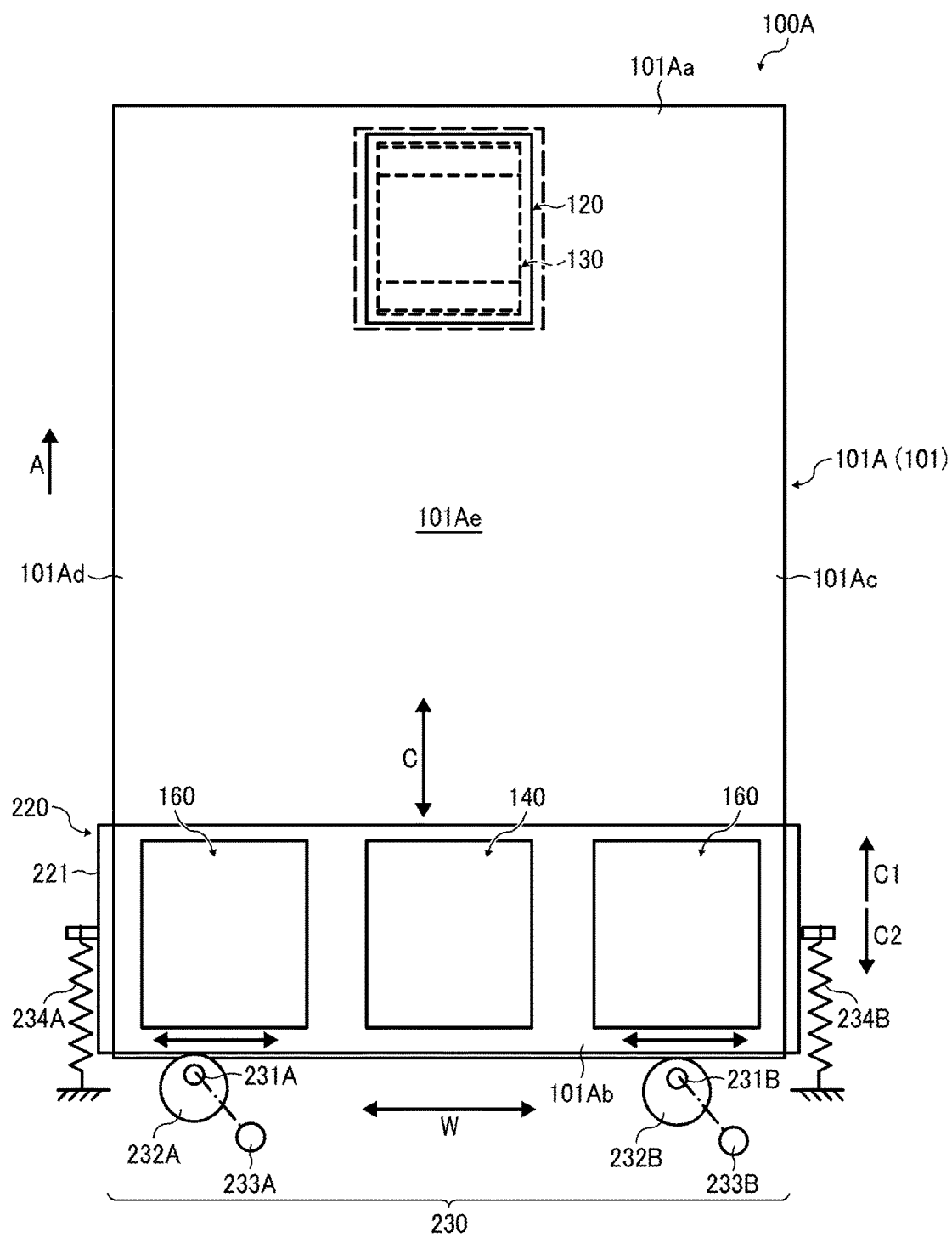
FIG. 18 is a plan view schematically illustrating a structure of the feeding device according to the second embodiment and a position of an end suction unit that has moved in a separating direction.

In the present second embodiment, as illustrated in FIG. 18, the second suction unit 140 and the third suction units 160A and 160B disposed at the trailing end 101Ab of the conveyed medium 101A are formed as one end suction unit 220. The end suction unit 220 is movable in parallel to the conveyance direction A, and the third suction units 160A and 160B are movable in the direction perpendicular to the conveyance direction W. The structure other than the above is similar to the structure according to the first embodiment. The feeding device 100A according to the present embodiment includes the end suction unit 220. The end suction unit 220 includes a frame board 221, and the second suction unit 140 and the third suction units 160A and 160B are hung on the frame board 221. The end suction unit 220 is movable in parallel to the conveyance direction A.

The feeding device 100A includes a moving device 230 that shifts the end suction unit 220 in parallel to the conveyance direction A and in a direction C approaching to or separating from the first suction unit 120. The moving device 230 includes cams 232A and 232B rotatably supported to shafts 231A and 231B, respectively, and disposed in the direction perpendicular to the conveyance direction; cam drive motors 233A and 233B each serving as a driving device to rotate cams 232A and 232B, respectively; and coil springs 234A and 234B each serving as a biasing member to bias the end suction unit 220 toward a direction to press one surface of the cams 232A and 232B. The cams 232A and 232B are eccentric cams and configured to rotatably move in the same direction by the cam drive motors 233A and 233B, respectively.

Figure 19:
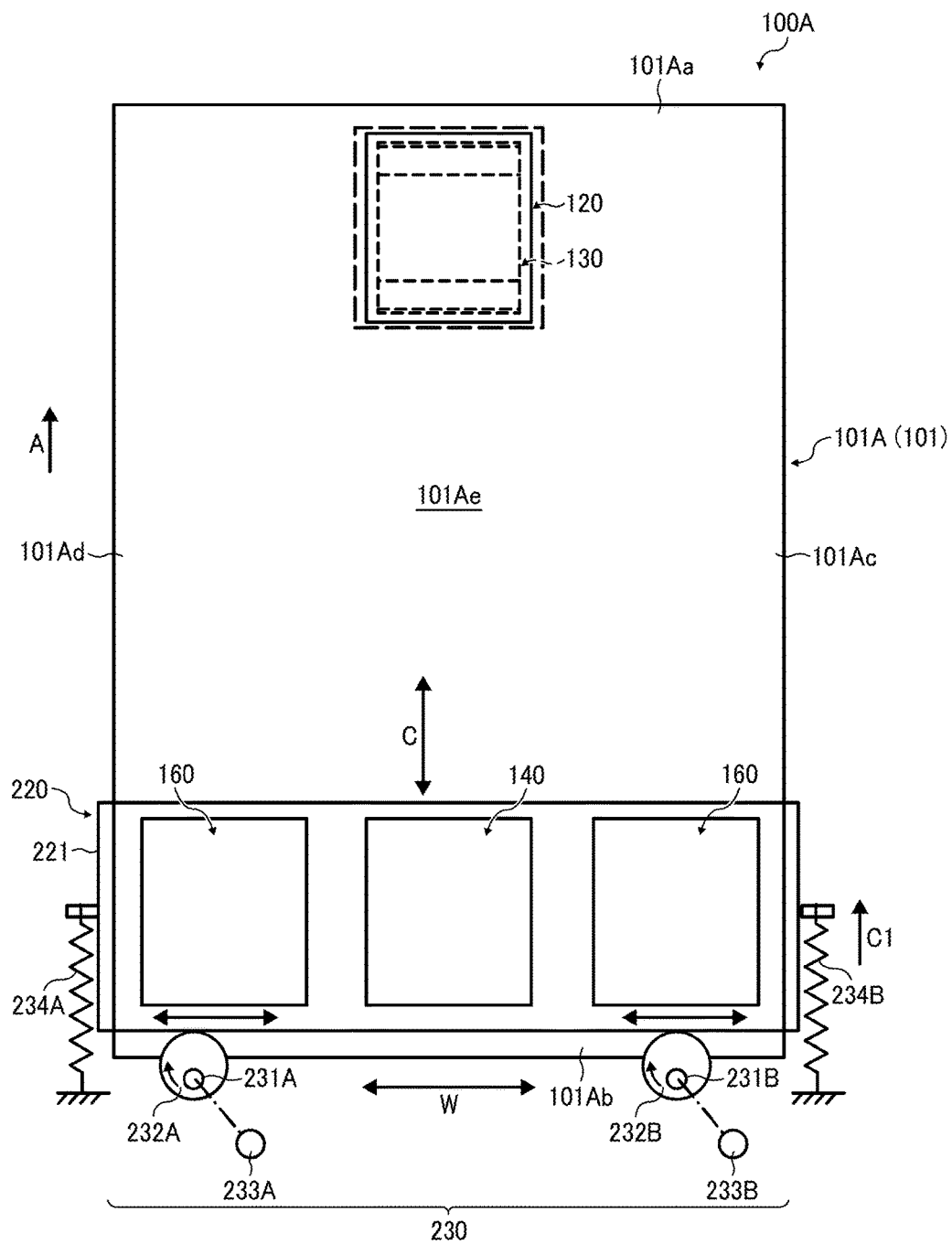
FIG. 19 is a plan view schematically illustrating a structure of the feeding device according to the second embodiment and a position of an end suction unit that has moved in an approaching direction.

The moving device operates the cam drive motors 233A and 233B to rotate the cams 232A and 232B clockwise by 180 degrees from a state as illustrated in FIG. 18, and moves the end suction unit 220 in the direction approaching to the first suction unit 120 as indicated by Arrow C1. The moving device 230 further rotates in the clockwise direction or rotates in the reverse direction by 180 degrees due to the operation of the cam drive motors 233A and 233B, and moves the end suction unit 220 in the direction separating from the first suction unit 120 as indicated by Arrow C2. FIG. 18 shows a state in which the end suction unit 220 is farthest from the first suction unit 120 and FIG. 19 shows a state in which the end suction unit 220 becomes nearest to the first suction unit 120. Specifically, the position of the end suction unit 220 as illustrated in FIG. 18 is an extended position in the conveyance direction A between the attracted position by the first suction unit 120 and the attracted position by the end suction unit 220. This position is the position in which the maximum-sized conveyed medium 101A is attracted in the conveyance direction A. The position of the end suction unit 220 in FIG. 19 is a narrowed position in the conveyance direction A between the attracted position by the first suction unit 120 and the attracted position by the end suction unit 220. This position is the position in which the minimum-sized conveyed medium 101A is attracted in the conveyance direction A.

As illustrated in FIGS. 20A and 20B, the feeding device 100A includes lateral shunts 180A and 180B to move the third suction units 160A and 160B, respectively, to the direction perpendicular to the conveyance direction W. The lateral shunts 180A and 180B are disposed to the end suction unit 220 and move the third suction units 160A and 160B in the direction perpendicular to the conveyance direction W. The lateral shunt 180A includes a conveyor belt 183A stretched and supported by at least two rollers 181A and 182A; and a lateral drive motor 184A serving as a drive source to drive to rotate either one roller 181A or 182A. The third suction unit 160A is hung on the conveyance face 183Aa of the conveyor belt 183A wound around the rollers 181A and 182A. The conveyor belt 183A of the lateral shunt 180A moves along the direction perpendicular to the conveyance direction W. The lateral shunt 180B includes a conveyor belt 183B stretched and supported by at least two rollers 181B and 182B; and a lateral drive motor 184B serving as a drive source to drive to rotate either one roller 181B or 182B. The third suction unit 160B is hung on the conveyance face 183Ba of the conveyor belt 183B wound around the rollers 181B and 182B. The conveyor belt 183B of the lateral shunt 180B moves along the direction perpendicular to the conveyance direction W. The lateral drive motors 184A and 184B each include a motor capable of rotating in the normal and reverse directions.

When the lateral shunt 180A drives the lateral drive motor 184A in the normal direction, for example, the conveyor belt 183A rotates clockwise. When the lateral shunt 180A drives the lateral drive motor 184A in the reverse direction, the conveyor belt 183A rotates counterclockwise. As a result, the third suction unit 160A mounted to the conveyance face 183Aa moves in the extending direction as indicated by Arrow W1 when the lateral drive motor 184A rotates in the normal direction, and moves in the shrinking direction indicated by Arrow W2 when the lateral drive motor 184A rotates in the reverse direction. When the lateral shunt 180B drives the lateral drive motor 184B in the normal direction, for example, the conveyor belt 183B rotates counterclockwise. When the lateral shunt 180B drives the lateral drive motor 184B in the reverse direction, the conveyor belt 183B rotates clockwise. As a result, the third suction unit 160B mounted to the conveyance face 183Ba moves in the extending direction as indicated by Arrow W1 when the lateral drive motor 184B rotates in the normal direction, and moves in the shrinking direction indicated by Arrow W2 when the lateral drive motor 184B rotates in the reverse direction.

Figure 21:
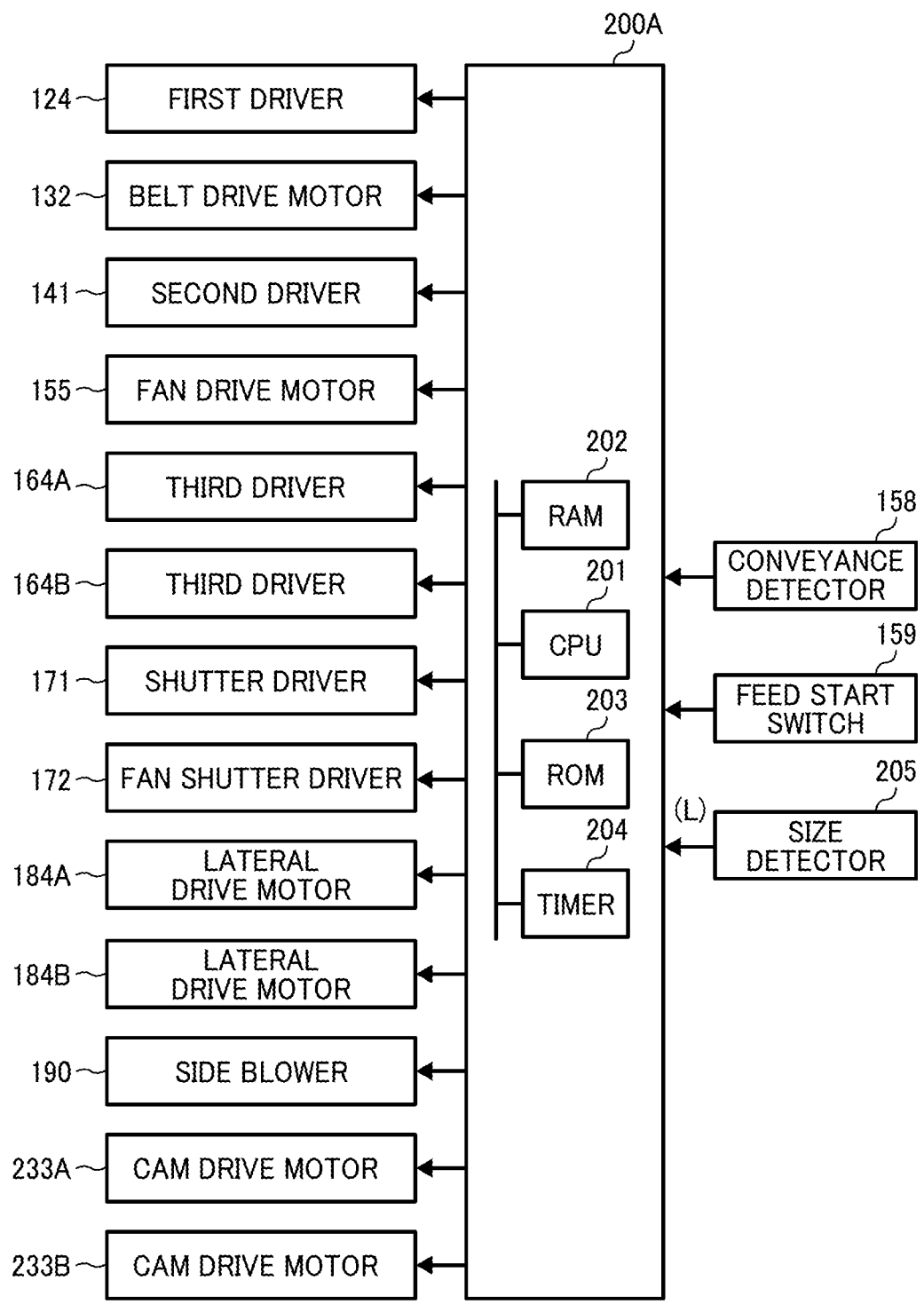
FIG. 21 is a block diagram illustrating control system of the feeding device according to the second embodiment.

Next, operation of the feeding device 100A will be described in detail, including positional control of the end suction unit 220. FIG. 21 is a block diagram illustrating a structure of the control system performed by a controller 200A according to the second embodiment. The feeding device 100A includes the controller 200A. The controller 200A includes a computer that includes the CPU 201, the RAM 202, the ROM 203, and the timer 204. At an input side of the controller 200A, the conveyance detector 158, the feed start switch 159, and a size detector 205 to detect size information L of the conveyed medium 101 are connected to the controller 200 via signal lines. The size information L of the conveyed medium 101 means the information related to a length in the approaching and separating direction C and the direction perpendicular to the conveyance direction W, and the entire length and width of the conveyed medium 101. The size detector 205 may be of a type to detect a distance between the side fences 112 and 112 of the stacker 110, or the position of the contact member 113. Otherwise, the size detector 205 may optically detect the trailing end 101Ab, and the ends 101Ac and 101Ad of the conveyed medium 101. At an output side of the controller 200A, the first driver 124, the belt drive motor 132, the second driver 141, the fan drive motor 155, the third drivers 164A and 164B, the shutter driver 171, the fan shutter driver 172, the shunts 184A and 184B, the side blower 190, the cam drive motors 233A and 233B are connected to the controller 200A via signal lines. Operation of the first driver 124, the belt drive motor 132, the second driver 141, the fan drive motor 155, the third drivers 164A and 164B, the shutter driver 171, the fan shutter driver 172, the shunts 184A and 184B, the side blower 190, and the cam drive motors 233A and 233B is controlled to be turned on and off by an operation timing stored in the ROM 203 of the controller 200A.

Figure 22:
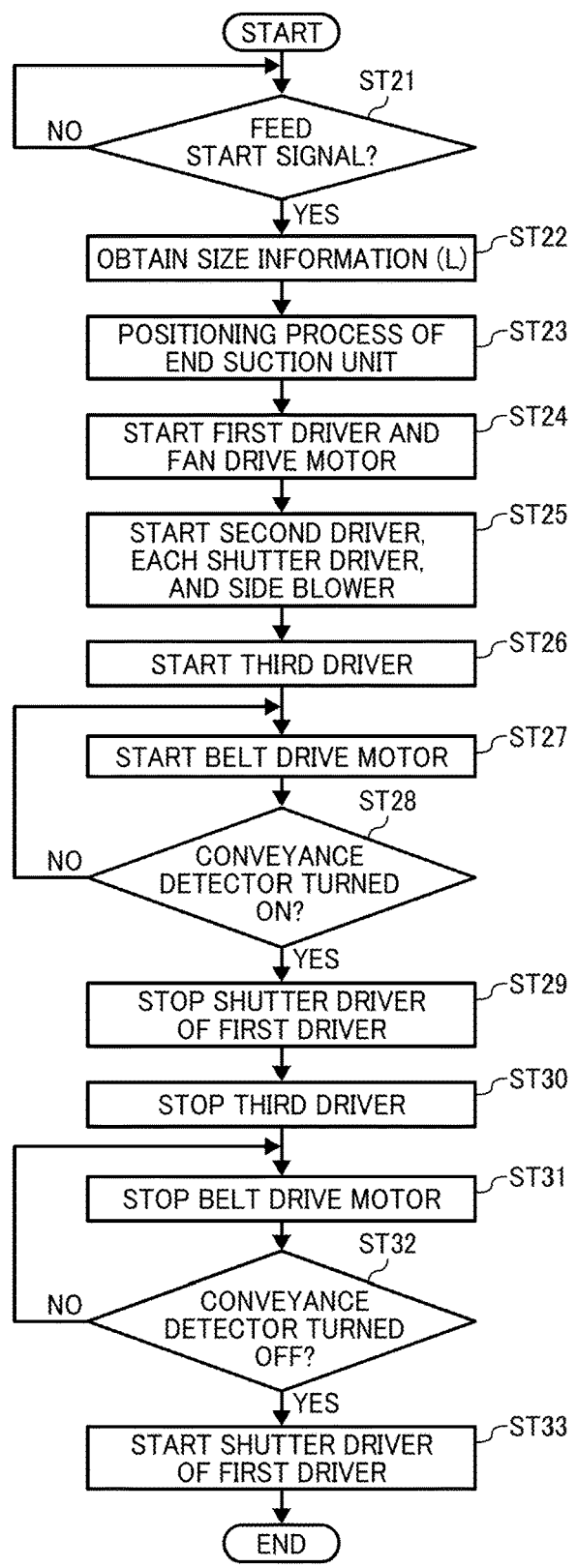
FIG. 22 is a flowchart illustrating an embodiment controlling the feeding device according to the second embodiment.

FIG. 22 is a flowchart illustrating absorption and conveyance control by the controller 200A of the feeding device 100A according to the second embodiment. The process details performed in Step ST24 to ST33 are similar to those performed in Step ST1 to ST11 according to the first embodiment referring to FIG. 13, and redundant description thereof will be omitted. When the feed start switch 159 is operated and the feed start signal is input in Step ST21 in FIG. 22, the controller 200A obtains the size information L from the size detector 205 in Step ST22, and performs positioning of the end suction unit 220 in Step ST23. In this process, the controller 200A performs positioning of the end suction unit 220 in the approaching and separating direction C and of the third suction units 160A and 160B in the direction perpendicular to the conveyance direction W.

For example, when the obtained size information is shorter than the reference size previously set in the ROM 203 in the approaching and separating direction C and the direction perpendicular to the conveyance direction W, the controller 200A drives the cam drive motors 233A and 233B, to thereby rotate the cams 232A and 232B. As a result, the end suction unit 220 is moved in the approaching direction C1 illustrated in FIG. 19 and the distance between the first suction unit 120 and the end suction unit 220 is reduced. Alternatively, the controller 200A may drive the shunts 184A and 184B in the reverse direction as illustrated in FIG. 20A, to thus drive the third suction units 160A and 160B in the direction W2 to reduce the distance between the third suction units 160A and 160B. As a result, even when the size of the conveyed medium 101A is small, the second suction unit 140 and the third suction units 160A and 160B can be positioned at positions where the trailing end 101Ab and the ends 101Ac and 101Ad of the direction perpendicular to the conveyance direction W of the small-sized conveyed medium 101A can be attracted.

On the other hand, when the obtained size information is larger than the reference size previously set in the ROM 203 in the approaching and separating direction C and the direction perpendicular to the conveyance direction W, the controller 200A drives the cam drive motors 233A and 233B, to thereby rotate the cams 232A and 232B. As a result, the end suction unit 220 is moved in the separating direction C2 illustrated in FIG. 18 and the distance between the first suction unit 120 and the end suction unit 220 is extended. Alternatively, the controller 200A may drive the shunts 184A and 184B in the normal direction as illustrated in FIG. 20B, to thus drive the third suction units 160A and 160B in the direction W1 to extend the distance between the third suction units 160A and 160B. As a result, even when the size of the conveyed medium 101A is large, the second suction unit 140 and the third suction units 160A and 160B can be positioned at positions where the trailing end 101Ab and the ends 101Ac and 101Ad in the direction perpendicular to the conveyance direction W of the large-sized conveyed medium 101A can be attracted. Thus, because the second suction unit 140 and the third suction units 160A and 160B are movable, the range where the suction force of the end suction unit 220 (that includes the second suction unit 140 and the third suction units 160A and 160B) exerts, can be variable. Specifically, because a range in which the suction force exerts to the trailing end 101Ab of the conveyed medium 101A can be variable, an optimal separation performance dealing with various-sized conveyed media 101 can be obtained, and the feeding device 100 with an optimal separation performance of the conveyed medium 101A can be provided.

Third Embodiment

Figure 23:
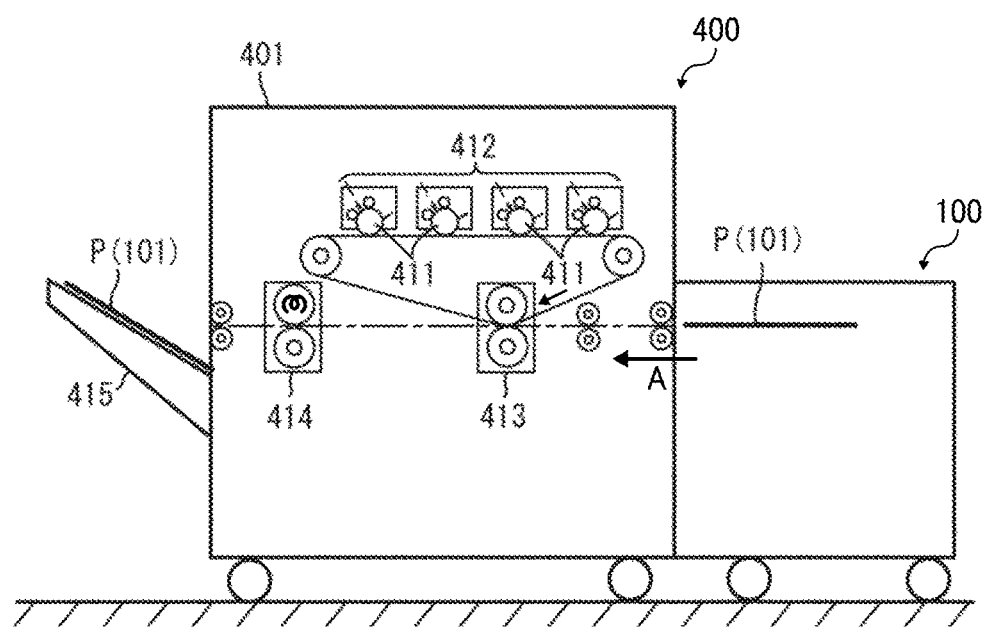
FIG. 23 schematically illustrates a structure of an image forming system according to the present disclosure.

As illustrated in FIG. 23, in the third embodiment, the feeding device 100 according to the first embodiment is applied to an image forming system 400. The image forming system 400 includes an image forming section 401 to form an image on a sheet P that serves as a conveyed medium; and a feeding device to feed the sheet P to the image forming section 401. The feeding device employs, for example, the feeding device 100. The image forming section 401 includes a plurality of process cartridge units 412 each including a drum-shaped image bearer 411. Each of the process cartridge units 412 forms an electrostatic latent image on the image bearer 411, respectively, and toner or a developing agent is adhered onto each of the electrostatic latent image so that the electrostatic latent image is developed as a toner image. The developed toner image is transferred, at a transfer section 413, onto the sheet P, and the toner image is fixed onto the sheet P at a fixing section 414. The sheet P is then stacked on an ejection tray 415. The above method is called electrophotographic method. The image forming section 401 may employ not only the electrophotographic method, but also inkjet method in which the image is formed on the sheet P by jetting ink from an ink head to the sheet P as a conveyed medium. Whichever method is employed in the image forming section, the topmost sheet P stacked on the stacker 110 is attracted and conveyed by the feeding device 100, the second suction unit 140, and the third suction units 160A and 160B. As a result, the separability of the sheet P is secured, the sheet jams and overlapped conveyance due to following conveyance are prevented, and the separation time can be reduced. Due to the reduced separation time, printing time is reduced, to thereby enable high-speed feeding and structuring a highly-productive image forming system 400 capable of handling a large-sized sheet. When the feeding device 100A according to the second embodiment is applied to the image forming system 400, the sheet P is properly separated in accordance with the various sizes and is conveyed so that the separation time can be reduced. As a result, the printing time is reduced and the high-speed printing becomes possible, the highly productive image forming system 400 can be structured, an optimal conveyance of the sheet P in accordance with the various sizes can be enabled, and an optimal image can be obtained.

Fourth Embodiment

Figure 24A:
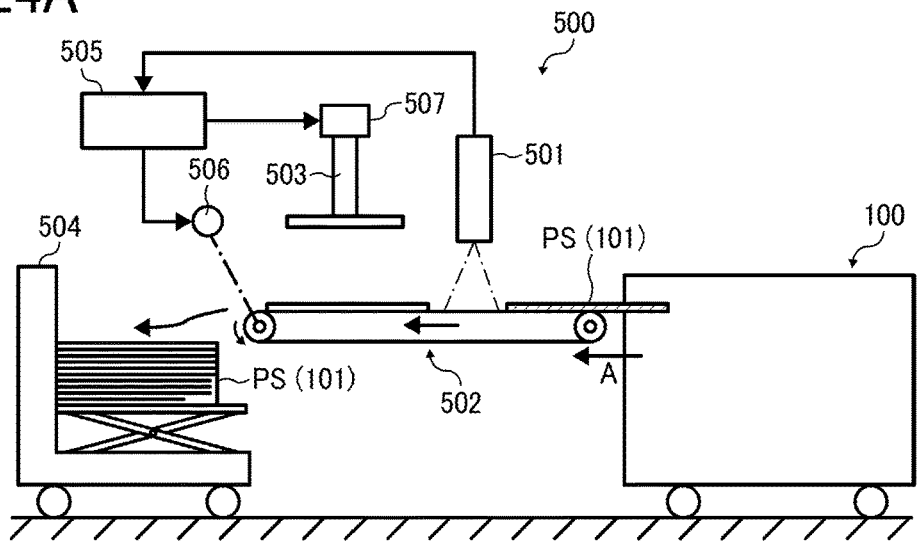
FIGS. 24A to 24C schematically illustrate a structure of a conveyed medium inspection system according to the present disclosure.
Figure 24B:
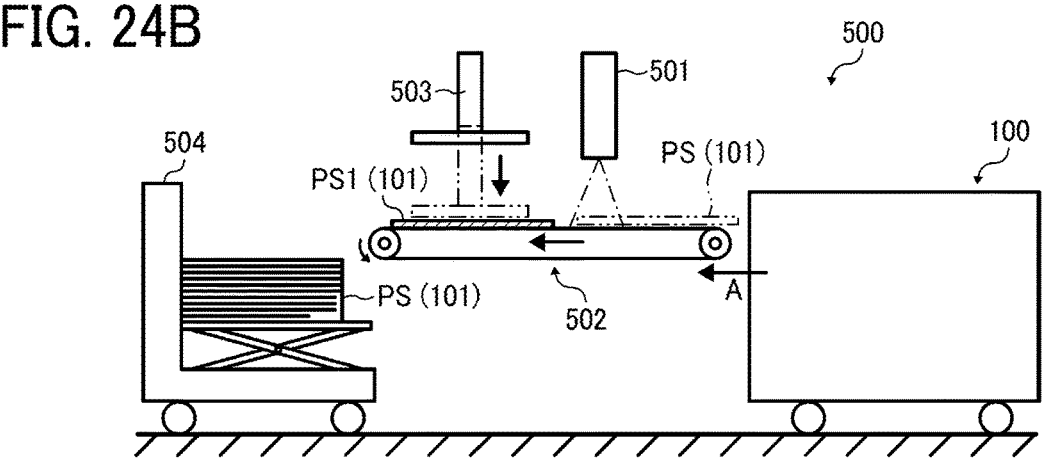
Figure 24C:
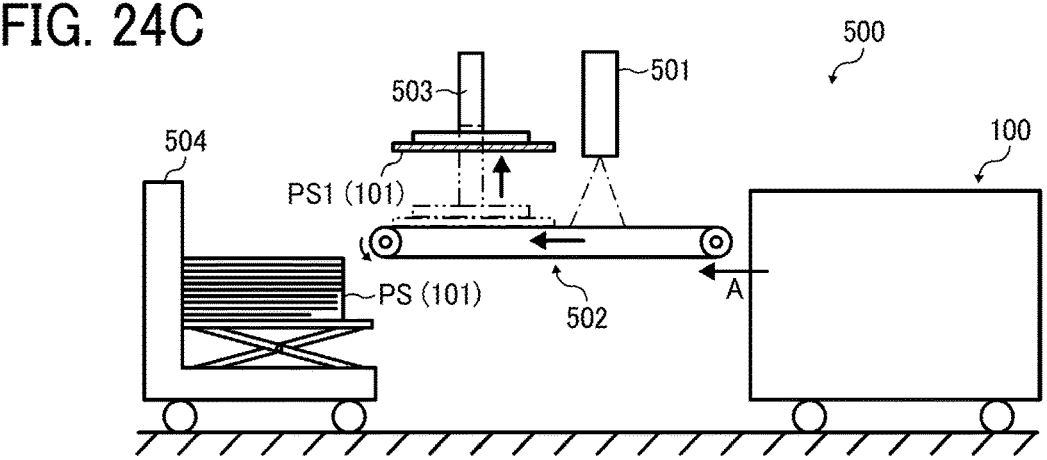

As illustrated in FIG. 24A, in the fourth embodiment, the feeding device 100 according to the first embodiment is applied to a conveyed medium inspection system 500. The conveyed medium inspection system 500 includes an inspection device 501 as an inspection section to inspect, for example, a prepreg sheet PS as a conveyed medium, a feeding device to feed the prepreg sheet PS to the inspection device 501, and a controller 505. The feeding device employs the feeding device 100. The conveyed medium inspection system 500 includes a sheet conveyor device 502, disposed below the inspection device 501, to convey the prepreg sheet PS. The prepreg sheet PS separated and conveyed by the feeding device 100 moves below the inspection device 501 via the sheet conveyor device 502 as illustrated in FIG. 24A. The inspection device 501 linearly scans scratches on the surface of the prepreg sheet PS or the size of the sheet as image information, and detects a status of the surface while the sheet conveyor device 502 conveying the prepreg sheet PS. The conveyed medium inspection system 500 includes a suction unit 503 disposed downstream of the inspection device 501 in the conveyance direction and upstream of the sheet conveyor device 502. The suction unit 503 attracts the prepreg sheet PS1 of which a defective surface is detected by the inspection device 501 as illustrated in FIGS. 24B and 24C. The conveyed medium inspection system 500 includes a stacker 504 disposed downstream of the sheet conveyor device 502 in the conveyance direction. The stacker 504 is used to stack the prepreg sheet PS without a defective surface among the prepreg sheets PS conveyed by the sheet conveyor device 502, that is, the prepreg sheet PS not attracted by the suction unit 503. As illustrated in FIG. 24A, the inspection device 501, a drive motor 506 as a power source of the sheet conveyor device 502, and an suction unit drive source 507 of the suction unit 503 are connected to the controller 505 via signal lines. The controller 505 determines whether the conveyed sheet PS is good or not by the image information sent from the inspection device 501. When the prepreg sheet PS detected by the inspection device 501 is defective (PS1), the controller 505 operates the suction unit drive source 507 of the suction unit 503 to exert a suction force onto the sheet conveyor device 502. As a result, the prepreg sheet PS1 determined as a defective sheet is removed from the sheet conveyor device 502 by the suction unit 503.

As described heretofore, while passing through the first suction unit 120, the second suction unit 140, and the third suction units 160A and 160B from the feeding device 100, the topmost prepreg sheet PS among stacked sheets is attracted and conveyed, the separability of the prepreg sheet PS is secured, jams and overlapped conveyance of the prepreg sheet due to the following conveyance can be prevented, and thus, the separation time can be reduced. The reduction in the separation time leads to a reduction of the inspection time of the prepreg sheet PS, to thereby deal with a high-speed conveyance, so that the high productive conveyed medium inspection system 500 can be structured. In addition, when the feeding device 100A according to the second embodiment is applied to the conveyed medium inspection system 500, the prepreg sheet PS is properly separated according to the various sizes and is conveyed, and the separation time can be reduced. As a result, the inspection time of the prepreg sheet PS is reduced and the high-speed conveyance is enabled. The highly productive conveyed medium inspection system 500 can be structured, and proper feeding of the prepreg sheet PS in accordance with the various sizes is enabled.

Various embodiments of the present disclosure have been described heretofore; however, the present disclosure is not limited to any specific embodiment, but may be variously modified and changed within the scope of the present disclosure described in the scope of claims unless limited particularly in the above description. For example, in the above description, the end suction 220 including the second suction unit 140, and the third suction units 160A and 160B is so disposed as to be movable in the approaching and separating direction C. Alternatively, the second suction unit 140 is secured, and the third suction units 160A and 160B alone are movable in the approaching and separating direction C using the moving device 230, so that the attracting position of the suction units may be changeable in accordance with the size of the conveyed medium 101A relative to the lateral sides 101Ac and 101Ad. Exemplary conveyed media 101 according to the present embodiment are not limited to the sheet P and resinous sheet material such as the prepreg sheet PS, but may include a recording sheet, a film, or fabrics. Specifically, the conveyed medium 101 may refer to any sheet-shaped attractable conveyed medium such as a sheet, a recording medium, an OHP, a prepreg, and copper foils.

Additional modifications and variations of the present disclosure are possible in light of the above teachings. It is therefore to be understood that, within the scope of the appended claims, the disclosure may be practiced other than as specifically described herein.

What is claimed is:

1. A feeding device to feed a conveyed medium stacked on a stacker, comprising:
    a first suction unit above the conveyed medium stacked on the stacker, the first suction unit including,
        a suction chamber,
        a suction fan configured to exhaust air from the suction chamber, and
        a first driver to rotate the suction fan;
    a second suction unit above the conveyed medium stacked on the stacker and behind the first suction unit in a conveyance direction of the conveyed medium, the second suction unit configured to attract the conveyed medium, the second suction unit including,
        a rotary fan including a board and a plurality of walls extending from the board, and
        a second driver to rotate the rotary fan; and
    a plurality of third suction units above the conveyed medium stacked on the stacker, the plurality of third suction units configured to attract ends of the conveyed medium, at least one of the plurality of third suction units being further in a direction perpendicular to the conveyance direction than the second suction unit, at least another of the plurality of third suction units being further in another direction perpendicular to the conveyance direction than the second suction unit, the another direction perpendicular to the conveyance direction being opposite the direction perpendicular to the conveyance direction, the direction perpendicular to the conveyance direction being parallel to a plane of a top surface of the conveyed medium stacked on the stacker, wherein
    the second suction unit and the plurality of third suction units at least partially overlap in the direction perpendicular to the conveyance direction.

2. The feeding device according to claim 1, wherein the plurality of third suction units is disposed parallel to the second suction unit in the direction perpendicular to the conveyance direction.

3. The feeding device according to claim 2, further comprising:
    at least one controller configured to control the first suction unit, the second suction unit, and the plurality of third suction units, such that the plurality of third suction units start attracting the ends of the conveyed medium after the second suction unit starts attracting the center of the conveyed medium.

4. The feeding device according to claim 1, further comprising:
    a conveyance device configured to convey the conveyed medium in the conveyance direction in a state in which the conveyed medium is attracted by at least the first suction unit.

5. The feeding device according to claim 1, wherein the second suction unit is at an upstream end of the conveyed medium in the conveyance direction of the conveyed medium.

6. The feeding device according to claim 1, wherein the plurality of third suction units is disposed at an upstream end or a downstream end of the conveyed medium in the conveyance direction of the conveyed medium.

7. The feeding device according to claim 1, wherein the plurality of third suction units are movable in the direction perpendicular to the conveyance direction.

8. The feeding device according to claim 1, wherein the second suction unit and the plurality of third suction units are movable in a direction parallel to the conveyance direction.

9. The feeding device according to claim 1, further comprising:
    a separator disposed at a downstream side of the conveyed medium stacked on the stacker in the conveyance direction, the separator being configured to blow air toward an end of the conveyed medium before the conveyed medium is attracted by the plurality of third suction units.

10. An image forming system comprising:
    an image forming section; and
    the feeding device according to claim 1, to feed the conveyed medium to the image forming section.

11. A conveyed medium inspection system comprising:
    an inspection device to inspect the conveyed medium; and
    the feeding device according to claim 1, to feed the conveyed medium to the inspection device.

12. A feeding device comprising:
    a first suction unit above a conveyed medium stacked on a stacker, the first suction unit configured to attract the conveyed medium stacked on the stacker, the conveyed medium including ends and a middle portion therebetween;
    a second suction unit above the conveyed medium stacked on the stacker and behind the first suction unit in a conveyance direction of the conveyed medium, the second suction unit configured to attract the conveyed medium;
    a plurality of third suction units above the conveyed medium stacked on the stacker, the plurality of third suction units configured to attract the ends of the conveyed medium; and
    at least one controller configured to control the first suction unit, the second suction unit and the third suction units, such that the second suction unit exerts a suction force sufficient to attract the middle portion of the conveyed medium before the plurality of third suction units exert a suction force sufficient to attract the ends of the conveyed medium.

13. The feeding device according to claim 12, further comprising:

a conveyance device configured to convey the conveyed medium in the conveyance direction after the conveyed medium is attracted by at least the first suction unit.

14. The feeding device according to claim 12, wherein the second suction unit is at an upstream end of the conveyed medium in the conveyance direction of the conveyed medium.

15. The feeding device according to claim 12, wherein the plurality of third suction units are movable in a direction perpendicular to the conveyance direction.

16. The feeding device according to claim 12, wherein the second suction unit and the plurality of third suction units are movable in a direction parallel to the conveyance direction.

17. The feeding device according to claim 12, further comprising:
   a separator configured to blow air toward the conveyed medium.

* * * * *